United States Patent
Jung et al.

(10) Patent No.: US 10,789,473 B2
(45) Date of Patent: Sep. 29, 2020

(54) METHOD AND DEVICE FOR PROVIDING AUGMENTED REALITY SERVICE

(71) Applicant: SAMSUNG ELECTRONICS CO., LTD., Suwon-si, Gyeonggi-do (KR)

(72) Inventors: Han-sub Jung, Yongin-si (KR); Sun-ho Moon, Hwaseong-si (KR); Seong-ki Ryu, Suwon-si (KR); Dong-hyun Han, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/137,892

(22) Filed: Sep. 21, 2018

(65) Prior Publication Data

US 2019/0095712 A1   Mar. 28, 2019

(30) Foreign Application Priority Data

Sep. 22, 2017 (KR) .................. 10-2017-0122807
Jan. 19, 2018 (KR) .................. 10-2018-0007295

(51) Int. Cl.
*G06K 9/00* (2006.01)
*H04N 5/232* (2006.01)
(Continued)

(52) U.S. Cl.
CPC ......... *G06K 9/00671* (2013.01); *G06F 16/50* (2019.01); *G06K 9/2054* (2013.01);
(Continued)

(58) Field of Classification Search
CPC .............. G06T 19/006; G06K 9/00671; H04N 5/23216; H04N 5/232933; H04N 5/232935; H04N 5/232945
See application file for complete search history.

(56) References Cited

U.S. PATENT DOCUMENTS 8,682,879 B2    3/2014 Kim et al.
2010/0149212 A1*  6/2010 Fukuya ................ G06K 9/6219
                                       345/629

(Continued)

FOREIGN PATENT DOCUMENTS

EP    1 870 856 A2    12/2007
JP      4185719      11/2008
(Continued)

OTHER PUBLICATIONS

Search Report and Written Opinion dated Jan. 8, 2019 in counterpart International Patent Application No. PCT/KR2018/011287.
(Continued)

*Primary Examiner* — Michelle L Sams
(74) *Attorney, Agent, or Firm* — Nixon & Vanderhye P.C.

(57) ABSTRACT

An augmented reality (AR) service clustering a plurality of markers for mapping an AR object by a device into at least one group and determining a representative marker of the clustered group, and preferentially searching for markers included in a cluster of the representative marker when a scene recognized by the device corresponds to the representative marker, is provided. An AR service generating an AR object based on data received from a user while a scene recognized by a device is displayed on a screen of the device and determining the recognized scene as a marker of the AR object is also provided. An AR service clustering a previously obtained plurality of pieces of content based on a predetermined reference and generating an AR object based on the plurality of clustered pieces of content is further provided.

17 Claims, 18 Drawing Sheets

(51) Int. Cl.
*G06T 19/00* (2011.01)
*G06K 9/20* (2006.01)
*G06F 16/50* (2019.01)

(52) U.S. Cl.
CPC ....... *G06T 19/006* (2013.01); *H04N 5/23216* (2013.01); *H04N 5/232933* (2018.08); *H04N 5/232935* (2018.08); *H04N 5/232945* (2018.08)

(56) References Cited

U.S. PATENT DOCUMENTS

| | | |
|---|---|---|
| 2012/0075341 A1 | 3/2012 | Sandberg |
| 2012/0105703 A1 | 5/2012 | Lee et al. |
| 2013/0249900 A1 | 9/2013 | Lee et al. |
| 2014/0015860 A1 | 1/2014 | Kim et al. |
| 2014/0129387 A1* | 5/2014 | Kardell ............ G06Q 30/0641 |
| | | 705/26.61 |
| 2015/0206218 A1* | 7/2015 | Banerjee ............ G06Q 30/0623 |
| | | 705/26.61 |
| 2015/0286871 A1 | 10/2015 | Kawamatsu et al. |
| 2017/0076428 A1 | 3/2017 | Ishikawa et al. |
| 2017/0256075 A1 | 9/2017 | Jung et al. |

FOREIGN PATENT DOCUMENTS

| | | |
|---|---|---|
| JP | 2011-145796 | 1/2011 |
| JP | 2011-060254 | 3/2011 |
| JP | 5960836 | 7/2016 |
| KR | 10-1462571 | 11/2014 |
| KR | 10-2015-0093536 | 8/2015 |
| KR | 10-2017-0021616 | 2/2017 |
| KR | 10-1722550 | 4/2017 |

OTHER PUBLICATIONS

European Extended Search Report dated Jun. 18, 2020 for European Application No. 18859313.1.

* cited by examiner

METHOD AND DEVICE FOR PROVIDING AUGMENTED REALITY SERVICE

CROSS-REFERENCE TO RELATED APPLICATIONS

This application is based on and claims priority under 35 U.S.C. § 119 to Korean Patent Application Nos. 10-2017-0122807, filed on Sep. 22, 2017 in the Korean Intellectual Property Office, and 10-2018-0007295, filed on Jan. 19, 2018, in the Korean Intellectual Property Office, the disclosures of which are incorporated by reference herein in their entireties.

BACKGROUND

1. Field

The disclosure relates to methods and devices for providing an augmented reality (AR) service and a non-transitory computer-readable recording medium having recorded thereon a program for executing a method of providing the AR service.

2. Description of Related Art

In general, augmented reality (AR) is a technology field providing a new paradigm for interaction and communication between humans and computers. Here, AR is a type of virtual reality generated by overlapping the real world viewed by users' eyes with a virtual world having additional information and showing an image. AR which is a concept that complements the real world with the virtual world uses a virtual environment created by computer graphics but may be different from general virtual reality in that AR is based on a real environment. Computer graphics serve to provide additional information necessary for the real environment. That is, the division between the real environment and a virtual screen is obscured by overlapping a three-dimensional virtual image with a real image viewed by the user.

In the AR field, research is actively proceeding into techniques necessary for matching real images and virtual images using a method of displaying new additional information such as virtual graphic images on images input from cameras, such that additional information may be provided to users.

SUMMARY

Methods and devices for providing an augmented reality (AR) service capable of generating and managing a marker and an AR object in a variety of ways when providing the AR service capable of experiencing AR are provided, the AR service being capable of allowing a user to experience AR by displaying the AR object overlapped on a real world scene recognized by the device.

Methods and devices for providing an AR service capable of increasing the efficiency of marker identification through clustering of a marker when the devices display an AR object using the marker are also provided.

Methods and devices for providing an AR service capable of increasing the accuracy of marker recognition by additionally providing device and user information when the devices generate a marker and identifying whether the marker is included in a recognized scene are also provided.

Additional aspects will be set forth in part in the description which follows and, in part, will be apparent from the description.

In accordance with an aspect of the disclosure, a method of providing an augmented reality (AR) service includes clustering a plurality of markers, the markers including a reference for mapping an AR object to a scene recognized by a device into at least one group based on a marker attribute; determining any one of the plurality of clustered markers as a representative marker of each of the at least one group; preferentially searching for markers included in a group of an identified representative marker instead of other markers to identify a marker with respect to a second scene recognized after a first scene is recognized when a representative marker corresponding to the first scene recognized by the device is identified among the representative marker of each of the at least one group; and overlapping and displaying an AR object mapped to the second scene on the second scene based on the marker identified as a result of the searching.

The plurality of markers may include an actual object included in each of a plurality of scenes recognized by the device, wherein the marker attribute includes at least one of a kind of the actual object, a time when the scene including the actual object is recognized by the device, and a position at which the scene including the actual object is recognized by the device, wherein the displaying includes extracting an AR object corresponding to the identified marker from a previously stored mapping database when the marker is identified.

The determining may include determining a representative marker of each of the at least one group based on a user input for selecting any one of the plurality of clustered markers.

The first scene and the second scene may be images recognized in a preview mode of a camera application executed by the device.

The method may further include clustering a plurality of pieces of content previously obtained by the device into at least one AR object group based on at least one of a position at which each of the plurality of pieces of content is obtained, and a time when each of the plurality of pieces of content is obtained, and a predetermined reference that is set through a user input; generating a marker of each of the at least one AR object group using at least one of the plurality of pieces of content; and overlapping and displaying content included in an AR object group mapped to the marker on the marker corresponding to the recognized scene when the scene recognized by the device corresponds to any one of the generated markers, wherein the plurality of pieces of content include at least one of an image, voice, music, handwriting information, text, and a moving image.

The method may further include separating the AR object from the marker when a predetermined type of user input is received with respect to the AR object overlapped and displayed on the marker in the scene recognized by the device; and overlapping and displaying the separated AR object on a predetermined position in at least one scene recognized by the device based on a position of the received user input.

In accordance with another aspect of the disclosure, a method of providing an augmented reality (AR) service includes generating an AR object based on data received from a user while a first scene recognized by a device is displayed on a screen of the device; determining the first scene as a marker of the AR object; mapping marker correction information to the AR object and the marker and storing the marker correction information, wherein the mapping marker correction information includes at least one of a position of the user and a direction of the device at a time when the first scene is recognized; and comparing a second scene with the marker based on the marker correction information when the second scene is recognized after storing the marker correction information, and overlapping and displaying the AR object on the second scene when the second scene corresponds to the marker.

The data received from the user may include at least one of handwriting data of the user received via an input device, voice data of the user, an image, music, text, and a moving image.

The displaying may include correcting the marker based on the position of the user and the direction of the device included in the marker correction information; and comparing the corrected scene with the second scene.

The method may include setting the device to a preview mode in which a scene is recognized and displayed when any one of a plurality of markers is selected based on a user input received on a marker list including information about the plurality of markers; displaying the selected marker on a screen of the device set to the preview mode; and overlapping and displaying an AR object mapped to the selected marker on the marker.

In accordance with another aspect of the disclosure, a device includes a memory storing one or more instructions; a display; a camera configured to recognize a scene around the device; and a processor configured to execute the one or more instructions stored in the memory, wherein the one or more instructions, when executed by the processor, cause the device to perform operations to: cluster a plurality of markers which are a reference for mapping an AR object to a scene recognized through the camera into at least one group based on a marker attribute, determine any one of the plurality of clustered markers as a representative marker of each of the at least one group when a representative marker corresponding to a first scene recognized by the device is identified among the representative marker of each of the at least one group, preferentially search for markers included in a group of the identified representative marker instead of other markers to identify a marker with respect to a second scene recognized after the first scene is recognized, and overlap and display an AR object mapped to the second scene on the second scene based on the marker identified as a result of the searching through the display.

In accordance with another aspect of the disclosure, a device includes a memory storing one or more instructions; a display; a camera configured to recognize a scene around the device; and a processor configured to execute the one or more instructions stored in the memory, wherein the one or more instructions, when executed by the processor, cause the device to perform at least one operation to: generate an AR object based on data received from a user while a first scene recognized by a device is displayed on a screen of the device, determine the first scene as a marker of the AR object, map marker correction information to the AR object and the marker and store the marker correction information wherein the marker correction information includes at least one of a position of the user and a direction of the device at a time when the first scene is recognized, and compare a second scene with the marker based on the marker correction information when the second scene is recognized after storing the marker correction information, and overlap and display the AR object on the second scene when the second scene corresponds to the marker.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
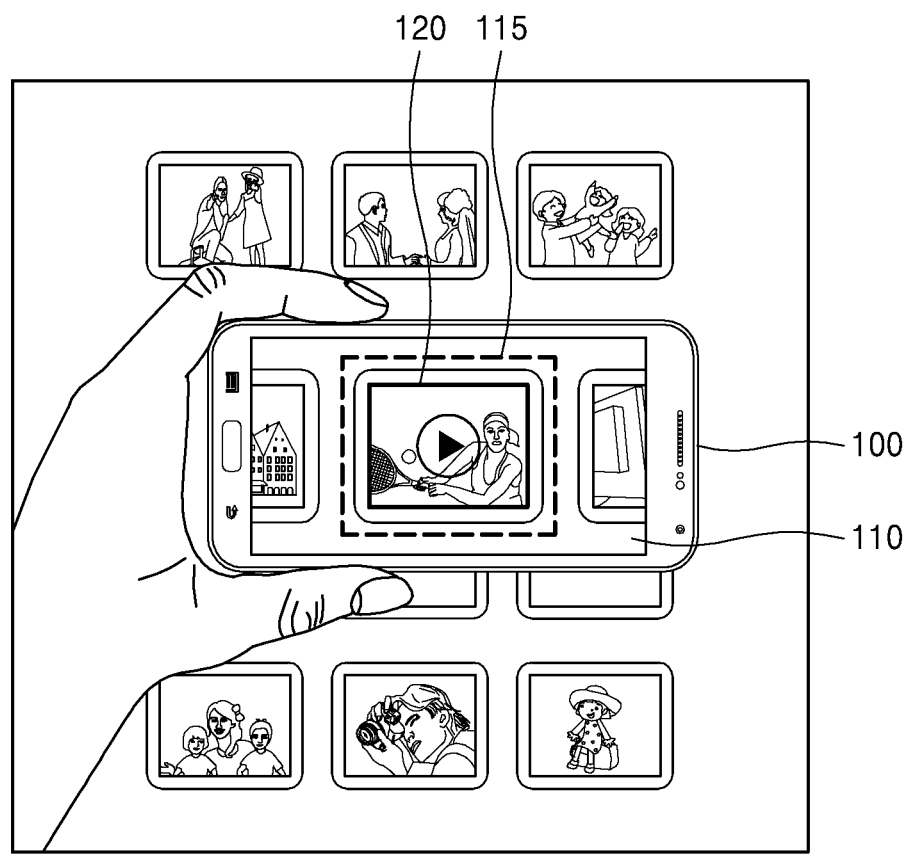
FIG. 1 is a diagram illustrating a method, performed by a device, of providing an augmented reality (AR) service, according to an embodiment.

Terms used in this disclosure will now be briefly described before describing various example embodiments in greater detail.

Although the terms used in the disclosure have been described in general terms that are currently used in consideration of the functions referred to in the disclosure, they are intended to encompass various other terms depending on the intent of those skilled in the art, precedents, or the emergence of new technology. Accordingly, the terms used in the disclosure are not defined based on the meaning of the term, not on the name of a simple term, but on the contents throughout the disclosure.

The terms including ordinals such as first, second, etc. may be used to describe various elements, but the elements are not limited by the terms. The terms are used for the purpose of distinguishing one element from another element. For example, without departing from the scope of the disclosure, a first element may be referred to as a second element, and similarly, the second element may also be referred to as the first element. The term "and/or" includes any combination of a plurality of related items or any item of the plurality of related items.

It will be understood that the terms "comprises", "comprising", "includes" and/or "including", when used herein, may denote the presence of stated elements, but do not preclude the presence or addition of one or more other elements. The term "unit" used herein may refer to software and/or hardware such as, for example, and without limitation, a field programmable gate array (FPGA), an application specific integrated circuit (ASIC), or the like, and the "unit" may perform some functions. However, the "unit" may be not limited to software or hardware. The "unit" may be configured to exist in an addressable storage medium or may be configured to reproduce one or more processors. Therefore, as an example, "units" may include various elements such as, for example, and without limitation, software elements, object-oriented software elements, class elements, task elements, processes, functions, attributes, procedures, subroutines, program code segments, drivers, firmware, microcodes, circuits, data, databases, data structures, tables, arrays, variables, or the like. Functions provided in "units" and elements may be combined into a smaller number of "units" and elements or may be divided into additional "units" and elements.

Reference will now be made to various example embodiments, examples of which are illustrated in the accompanying drawings, wherein like reference numerals refer to like elements throughout. In this regard, the present example embodiments may have different forms and should not be limited to the descriptions set forth herein. In the following description, for clarity, parts or elements that are not related to the embodiments may be omitted.

FIG. 1 is a diagram illustrating a method performed by a device 100 of providing an augmented reality (AR) service according to an embodiment.

Referring to FIG. 1, the device 100 may provide the AR service to a user by overlapping and displaying an AR object on a scene of the real world. In the present disclosure, the AR object may be provided to give the user a virtual experience together with the real world and may be provided in various forms such as an image, a moving image, voice, text, and the like.

Also, to overlap and display the AR object on a recognized scene, the device 100 may use a marker to determine a position of the scene on which the AR object is displayed. According to an embodiment, the device 100 may extract relative coordinates with respect to the marker to determine the position of the scene on which the AR object is displayed. However, this is only an example, and a method performed by the device 100 of determining the position on which the AR object is displayed with respect to the marker is not limited to the above-described example.

For example, in FIG. 1, when a predetermined scene 110 is recognized, the device 100 may determine whether the marker is included in the scene 110. The device 100 may determine an AR object that is mapped to a predetermined photo 115 when the predetermined photo 115 is identified using the marker within the scene 110. In the present embodiment, it is assumed that the AR object mapped to the photo 115 is a moving image 120 including a plurality of travel photos. The device 100 may display the moving image 120 including the plurality of travel photos on a predetermined position within the scene 110 with respect to the photo 115 when the photo 115 is identified.

Meanwhile, to more quickly identify the marker included in a recognized scene, the device 100 according to an embodiment may cluster and store a plurality of markers previously stored in the device 100 into at least one group based on attributes of the markers. When the clustered group is used to identify a representative marker of each group in a scene, the device 100 may increase the search ranking of markers in a group corresponding to a specific marker, thereby reducing time taken to identify the markers. This will be described later in greater detail with reference to FIGS. 2 to 4.

The device 100 according to an embodiment may change a position of a marker, to change the position of the scene on which the AR object is displayed. For example, when a predetermined type of user input is received at the position of the marker in the recognized scene, the device 100 may change the position of the marker based on the received user input. An example of the user input may include a touch input and a drag input, or the like, but this is merely an example, and the user input is not limited to the above examples. A method performed by the device 100 of changing the position of the marker in the scene will be described later in greater detail with reference to FIGS. 5 and 6.

To increase the recognition rate of the marker, the device 100 according to an embodiment may store information about a position of the device 100 at the time when the marker is generated, a direction of a camera, and the like as marker correction information. For example, when the device 100 uses the recognized scene as the marker, the device 100 may often recognize the scene as a different scene in spite of the same place or object, based on the position of the device 100 or the direction of the camera. The device 100 may identify the marker even when a current position of the device 100 or a current direction of the camera is not the same as the position of the device 100 at the time when the marker is generated or the direction of the camera by correcting the recognized scene based on the marker correction information. This will be described later in greater detail with reference to FIGS. 7 and 8.

The device 100 according to an embodiment may provide an AR preview mode such that the user may experience the AR object corresponding to the marker in advance. For example, when the user selects a specific marker, the device 100 may display the specific marker on the screen and overlap and display the AR object mapped to the specific marker on the scene. The device 100 may display the specific marker selected in the AR preview mode in which the recognized scene is displayed on the screen and overlap and display the AR object with the displayed specific marker, thereby enabling the user to experience the AR service in advance. This will be described in greater detail below with reference to FIGS. 9 and 10.

The device 100 according to an embodiment may cluster a plurality of previously stored images into a plurality of groups based on a position and a time at which a plurality of images are captured. The device 100 may generate a predetermined image included in each of the plurality of groups as a marker, and when the predetermined image is recognized, provide an image of a group including the predetermined image as the AR object. This is merely an example, and the device 100 may select the image provided as the AR object based on a user input. This will be described later in greater detail below with reference to FIGS. 11 to 13.

Figure 2:
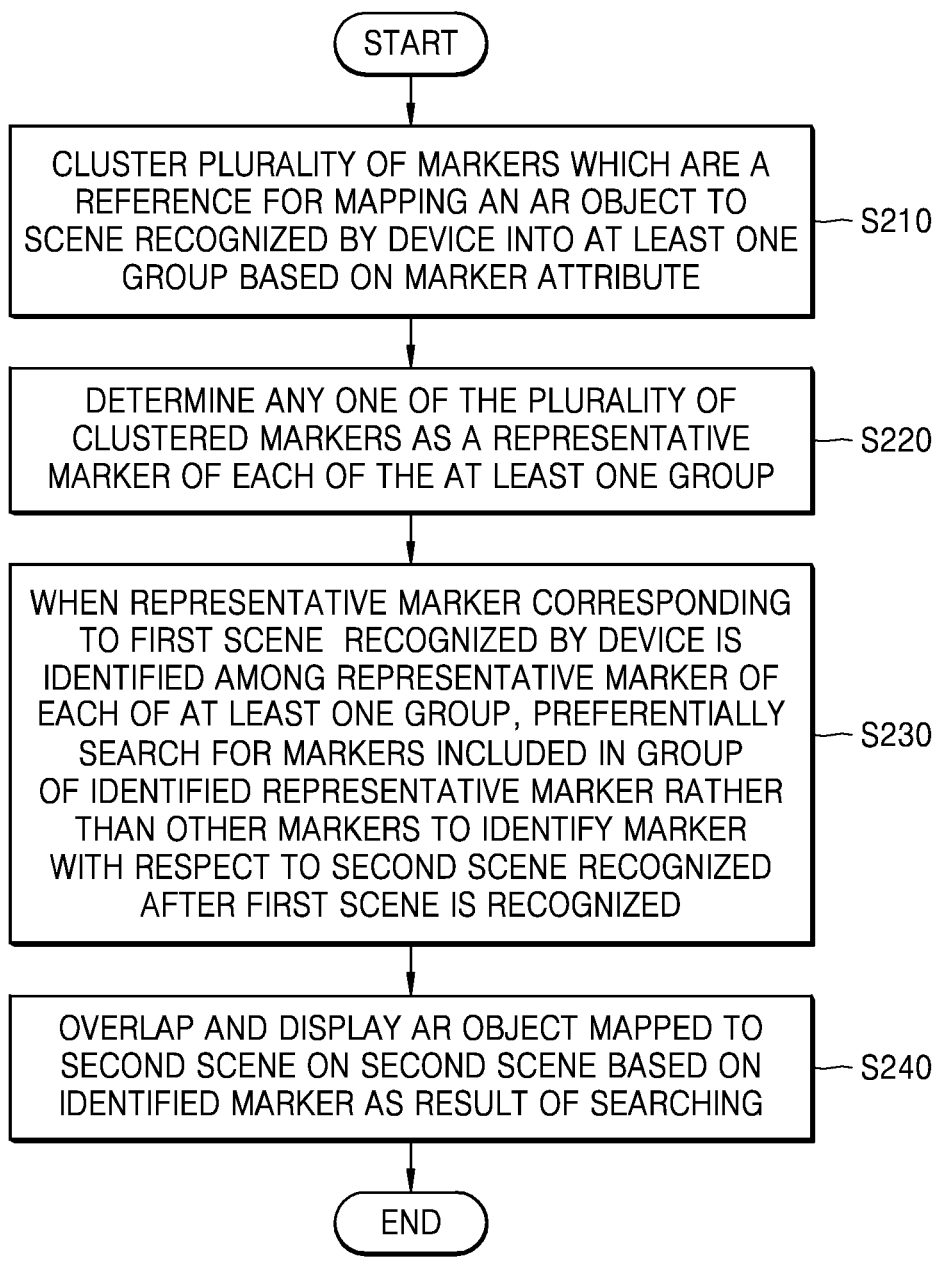
FIG. 2 is a flowchart illustrating a method, performed by a device, of searching for a marker corresponding to a recognized scene, according to an embodiment.

FIG. 2 is a flowchart illustrating a method performed by a device of searching for a marker corresponding to a recognized scene according to an embodiment.

In operation S210, the device may cluster a plurality of markers as a reference for mapping an AR object to the recognized scene into at least one group based on the marker attribute.

The device according to an embodiment may specify a position in a specific scene on which the AR object is to be displayed using the marker, to overlap and display the AR object on the specific scene. The device may previously generate and store the plurality of markers to specify a position in each of various recognized scenes on which at least one AR object is displayed.

Also, when the scene is recognized, the device may compare the plurality of previously generated markers with the recognized scene to identify the marker with respect to the recognized scene. For example, the device may determine whether an actual object A included in the scene corresponds to any one of the plurality of previously generated markers.

The device may cluster the plurality of markers into the at least one group based on the marker attribute, to reduce the power consumed for identifying the marker corresponding to the recognized scene. The marker attribute may include at least one of a position in which and a time at which the marker is generated and a kind of the actual object used as the marker. For example, the device may cluster the plurality of markers according to at least one of a position, a time, and a kind of an object such as a marker generated at a place X, a marker generated at a date Y, and a marker of an origami pattern. However, this is only an example, and the marker attribute is not limited to the above example.

Also, the device may determine an attribute that serves as a reference for clustering the plurality of markers according to context information at the time when the scene is recognized. Here, the context information may include state information of the device or a peripheral state of the device. For example, the context information may include whether a GPS is turned on in the device, whether position information recognized by the device is continuously changed, and the like. When the GPS is turned on, the device may cluster the plurality of markers in real time according to positions.

According to another embodiment, the device may determine the attribute as reference for clustering the plurality of markers based on a user selection. For example, when the user selects a time from among a position, the time, and the kind of the actual object used as the marker that are the attributes as the reference for clustering the plurality of markers, the device may cluster the plurality of markers based on the time.

In operation S220, the device may determine any one of the plurality of clustered markers as a representative marker of each of the at least one group.

For example, the device may determine one of marker 1, marker 2, and marker 3 included in group 1 generated as a result of the clustering as a representative marker of the group 1.

Meanwhile, the device according to an embodiment may determine the representative marker of the group based on a received user input. However, this is an embodiment only, and according to another embodiment, the device may determine a firstly generated marker among the plurality of markers included in the group as the representative marker.

In operation S230, when a representative marker corresponding to a first scene recognized by the device is identified among the representative marker of each of the at least one group, the device may preferentially search for markers included in a group of the identified representative marker rather than (e.g., instead of) other markers to identify a marker with respect to a second scene recognized after the first scene is recognized.

The device may compare the first scene with the representative marker of each of the at least one group as a result of the clustering when the first scene is recognized. The device may identify the representative marker corresponding to the actual object included in the first scene as a result of the comparison. When the representative marker is identified, the device may increase the search ranking of the other markers included in the group including the representative marker with respect to another scene recognized after the first scene.

When the representative marker is identified, the device may search for other markers included in the same cluster as the representative marker when recognizing another subsequent scene, thereby reducing the computing power consumed in searching for the marker.

Meanwhile, the representative marker according to an embodiment may be a quick response (QR) code in the form of a text or a number. When the representative marker is configured as the QR code, the device may recognize the QR code included in the scene and preferentially search for markers included in a group including the recognized QR code.

In operation S240, the device may overlap and display an AR object that is mapped to the second scene on the second scene based on the marker identified as a result of the searching.

When a marker corresponding to the second scene is identified as a result of searching for other markers of the group including the representative marker, the device may determine an AR object mapped to the identified marker. For example, when the marker is identified, the device may extract the AR object corresponding to the identified marker from a previously stored mapping database. The mapping database may be a database storing information about the AR object corresponding to the marker. The device may include and manage the mapping database to provide the AR service.

Further, the device may determine a position of the AR object overlapped and displayed on the second scene with respect to the identified marker. For example, the device may overlap and display the AR object on the identified marker or may overlap and display the AR object on a predetermined direction and distance with respect to the identified marker according to another example.

Meanwhile, according to another embodiment, the device may download the representative marker and the AR object from an external server with reference to operations S210 to S240, or upload the representative marker and the AR object for each group determined by the device to the external server. Accordingly, the device may use the representative marker and the AR object uploaded from another device to the external server, or provide the representative marker and the AR object to the other device.

Figure 3:
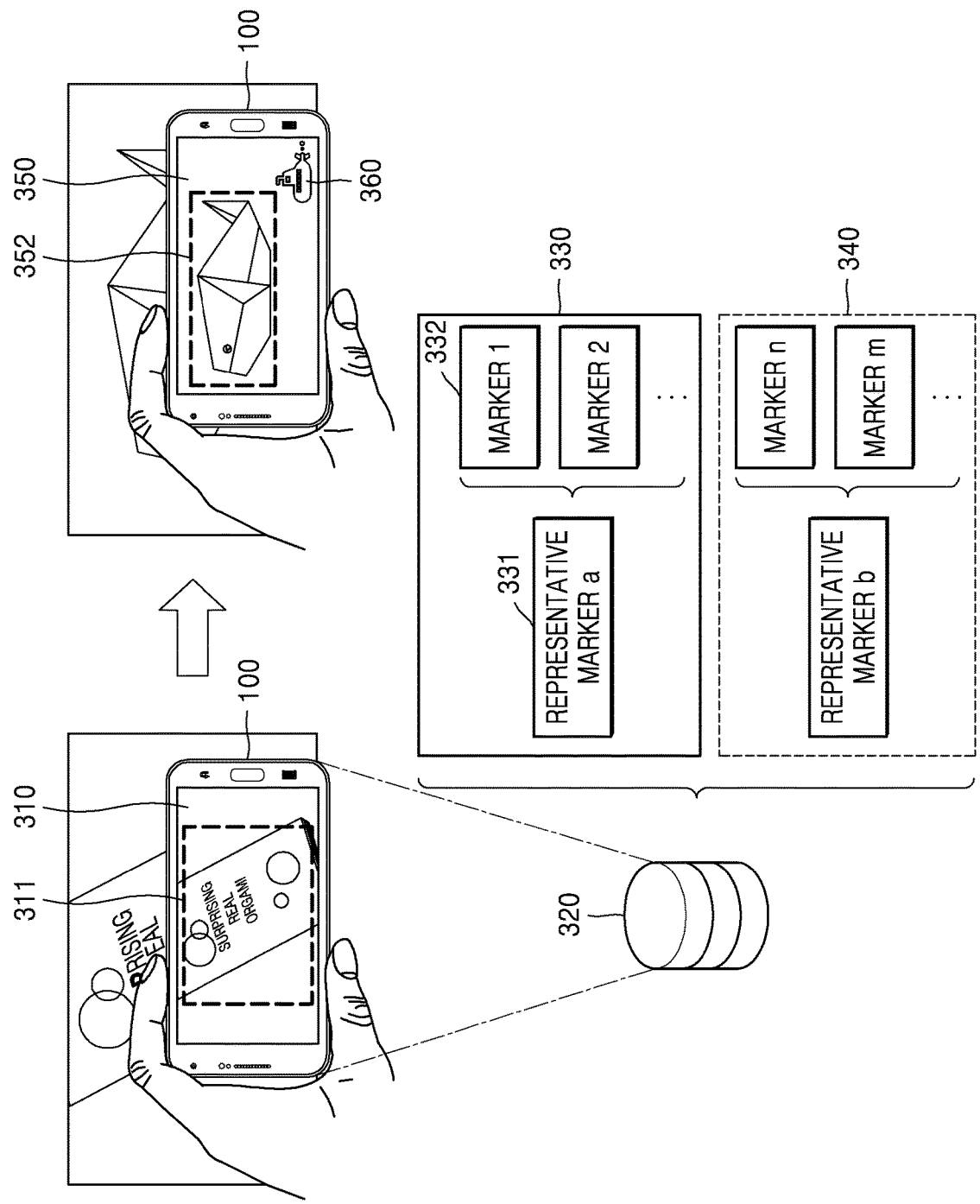
FIG. 3 is a diagram illustrating a method, performed by a device, of searching for a marker corresponding to a recognized scene, according to an embodiment.

FIG. 3 is a diagram illustrating a method performed by the device 100 of searching for a marker corresponding to a recognized scene according to an embodiment.

Referring to FIG. 3, when a first scene 310 is recognized, the device 100 may determine whether a representative marker corresponding to the first scene 310 is present among a plurality of previously stored representative markers. Here, it is assumed that the device 100 stores information about a plurality of groups 330 and 340 generated as a result of clustering a plurality of markers in a database 320 based on the marker attribute. It is also assumed that the device 100 operates in an AR mode in which an AR object is overlapped and displayed on a scene in the real world. However, this is only an example, and the device 100 does not perform the above-described operation only in the AR mode.

The device 100 may confirm that an origami book cover 311 included in the first scene 310 corresponds to a representative marker a 331 of the group 1 330 as a result of the determination. When the representative marker a 331 corresponding to the first scene 310 is identified, the device 100 may increase the search ranking of other markers included in the group 1 330 for another scene that may be identified after the first scene 310.

For example, the device 100 may estimate that the origami book content will be recognized as a scene when the origami book cover 311 is recognized. Accordingly, the device 100 may adjust the search ranking such that markers relating to the origami included in the group 1 330 may be searched for preferentially.

Accordingly, when a second scene 350 is recognized, the device 100 may preferentially search for the markers included in the group 1 330 and determine whether a marker corresponding to the second scene 350 is present. When a whale origami pattern 352 included in the second scene 350 is identified as a marker 1 332 of the group 1 330, the device 100 may obtain a submarine image 360 that is an AR object mapped to the marker 1 332. The device 100 may provide an AR service to a user by overlapping and displaying the obtained submarine image 360 on the second scene 350.

Figure 4:
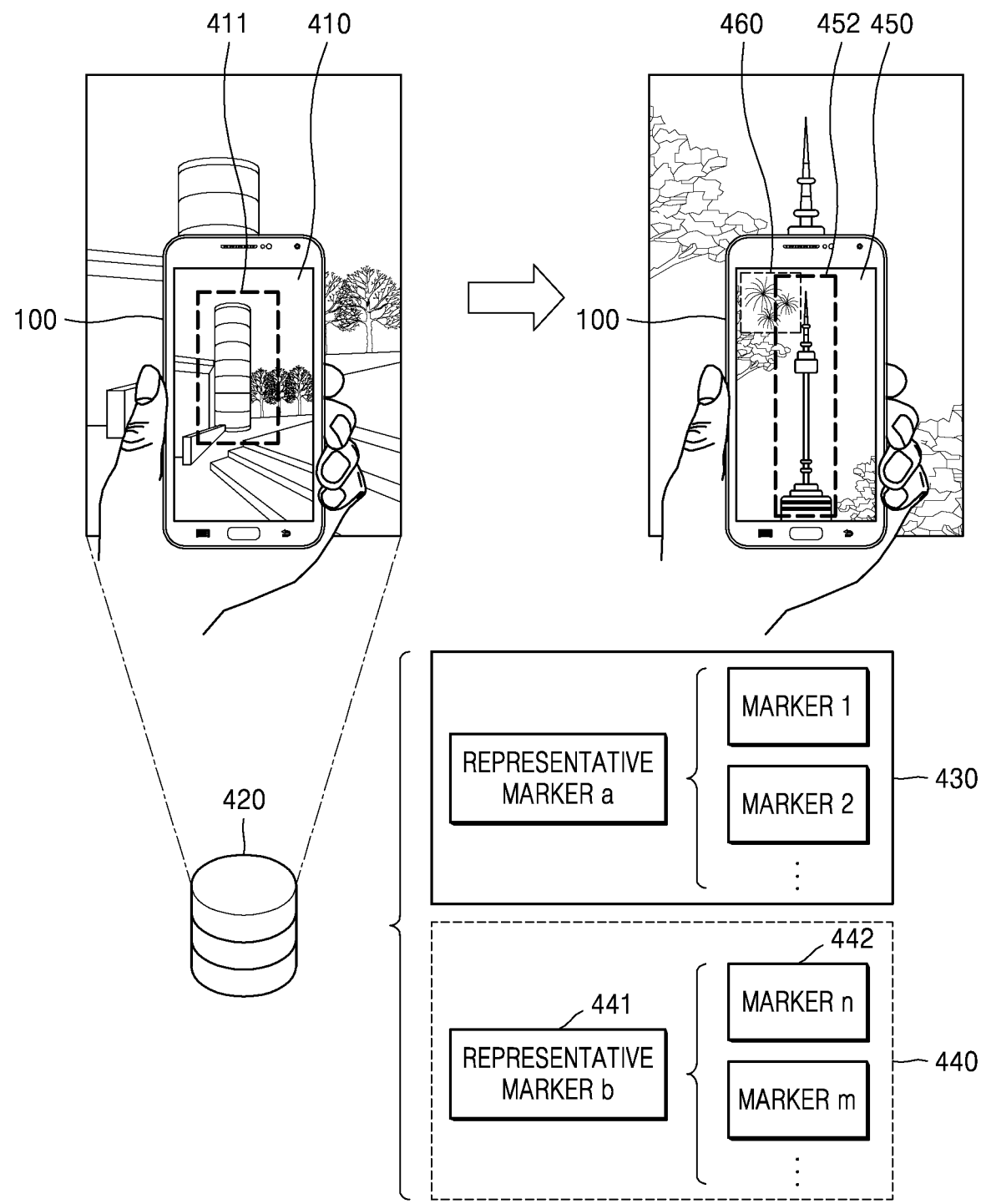
FIG. 4 is a diagram illustrating a method, performed by a device, of searching for a marker corresponding to a recognized scene, according to another embodiment.

FIG. 4 is a diagram illustrating a method performed by the device 100 of searching for a marker corresponding to a recognized scene according to another embodiment.

Referring to FIG. 4, the device 100 may determine whether a representative marker corresponding to a first scene 410 is present among a plurality of previously stored representative markers when the first scene 410 is recognized. Here, it is assumed that the device 100 stores information about a plurality of groups 430 and 440 generated as a result of clustering a plurality of markers in a database 420 according to the marker attribute.

The device 100 may confirm that a ticket office 411 included in the first scene 410 corresponds to a representative marker b 441 of the group 2 440 as a result of the determination. The group 2 440 may be a group of a group of Namsan tower-related markers generated as a result of clustering the plurality of markers according to positions where the markers are generated. When the representative marker b 441 corresponding to the first scene 410 is identified, the device 100 may increase the search ranking for other markers included in the group 2 440 for another scene that may be recognized after the first scene 410.

For example, when the ticket office 411 of the Namsan tower is recognized, the device 100 may estimate that a scene of the Namsan tower will be recognized later. Accordingly, the device 100 may adjust the search ranking such that markers relating to the Namsan tower included in the group 2 440 may be preferentially searched for.

Accordingly, when a second scene 450 is recognized, the device 100 may preferentially search for the markers included in the group 2 440 and determine whether a marker corresponding to the second scene 450 is present. When Namsan tower 452 of the second scene 450 is identified as a marker n 442 of the group 2 440, the device 100 may obtain a firework image 460 that is an AR object mapped to the marker n 442. The device 100 may provide an AR service to a user by overlapping and displaying the obtained firework image 460 on the second scene 450.

Figure 5:
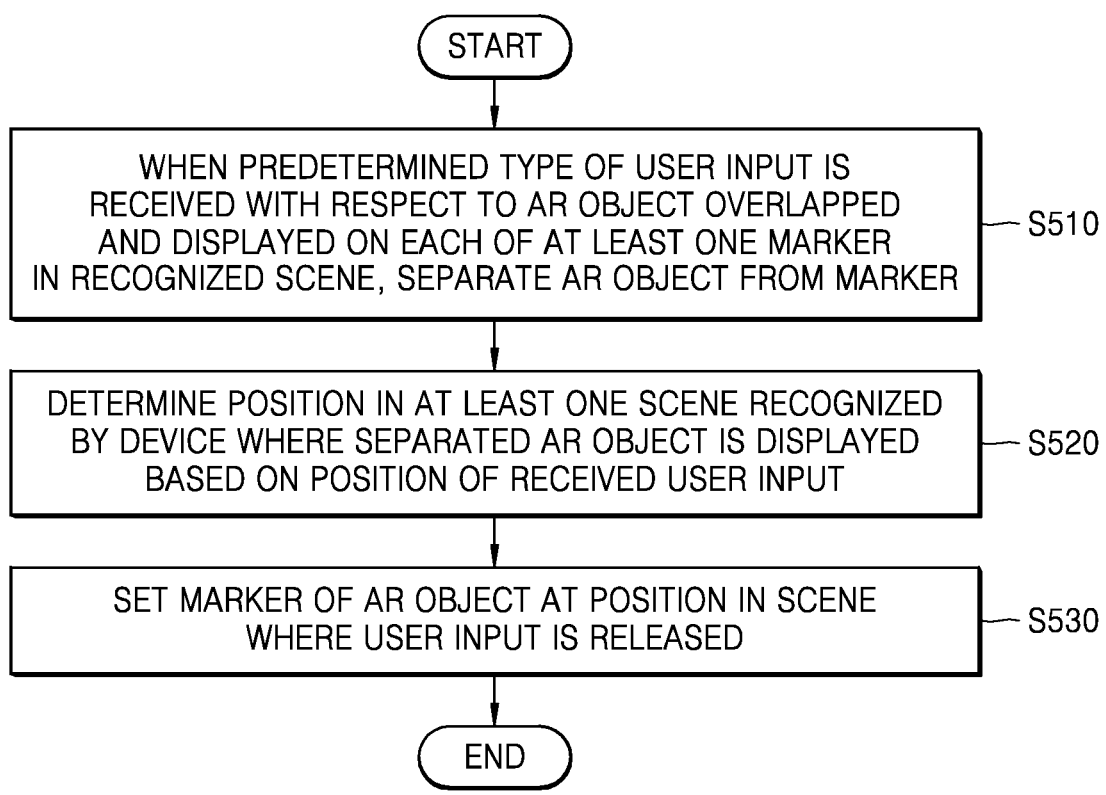
FIG. 5 is a flowchart illustrating a method, performed by a device, of changing a marker in a scene, according to an embodiment.

FIG. 5 is a flowchart illustrating a method performed by a device of changing a marker in a scene according to an embodiment.

In operation S510, when a predetermined type of user input is received with respect to an AR object overlapped and displayed on each of at least one marker in the recognized scene, the device may separate the AR object from the marker.

When the at least one marker is identified in the recognized scene, the device according to an embodiment may overlap and display the AR object mapped to each of the identified at least one marker on the scene. For example, the device may overlap and display the AR object on the identified marker. However, this is only an example, and a position on which the AR object is displayed is not limited to a position of the marker. According to another non-limiting example, the AR object may be displayed on a predetermined coordinate position with respect to the marker.

Meanwhile, the device may receive the predetermined type of user input at the position on which the AR object is displayed. For example, the device may receive a long press touch input that touches the AR object for more than a threshold time. When the user input is received on the AR object, the device may determine that a user wishes to move the AR object. Accordingly, the device may set a mode of the device to a mapping change mode.

In operation S520, the device may determine a position in at least one scene recognized by the device where the separated AR object is displayed based on a position of the received user input.

The device may move the AR object based on the position of the received user input such that the user may more easily change the position of the AR object in the mapping change mode. Here, since the AR object and the marker are separated, the user may not need to maintain a fixed posture to allow the device to recognize the marker. Accordingly, even when the user changes a position and direction of the device or a camera of the device while the user is dragging the AR object and a previously mapped marker is not recognized, the scene and the AR object may be overlapped and displayed on a screen of the device.

Also, the user may easily move the AR object to the position of the marker to be changed even when the position or direction of the device or the camera of the device is changed, without having to continuously maintain one posture to fixedly display the recognized scene.

In operation S530, the device may set a marker of the AR object at a position in the scene where the user input is released.

The device according to an embodiment may generate a new marker based on a position of a drag input at the time the user input to drag the AR object is stopped in the mapping change mode. For example, the user may move the AR object overlapped and displayed on the marker at a position (x1, y1) to a position (x2, y2) through the drag input, and when the drag input is stopped at the position (x2, y2), the device may generate an actual object located at (x2, y2) as the marker.

However, this is only an example, and a type of user input received for changing mapping information is not limited to the above-described example. According to another example, the device may cancel registration of the marker when the user long touches the AR object that is mapped to the recognized marker and displayed and then drags the AR object out of the screen of the device.

Figure 6:
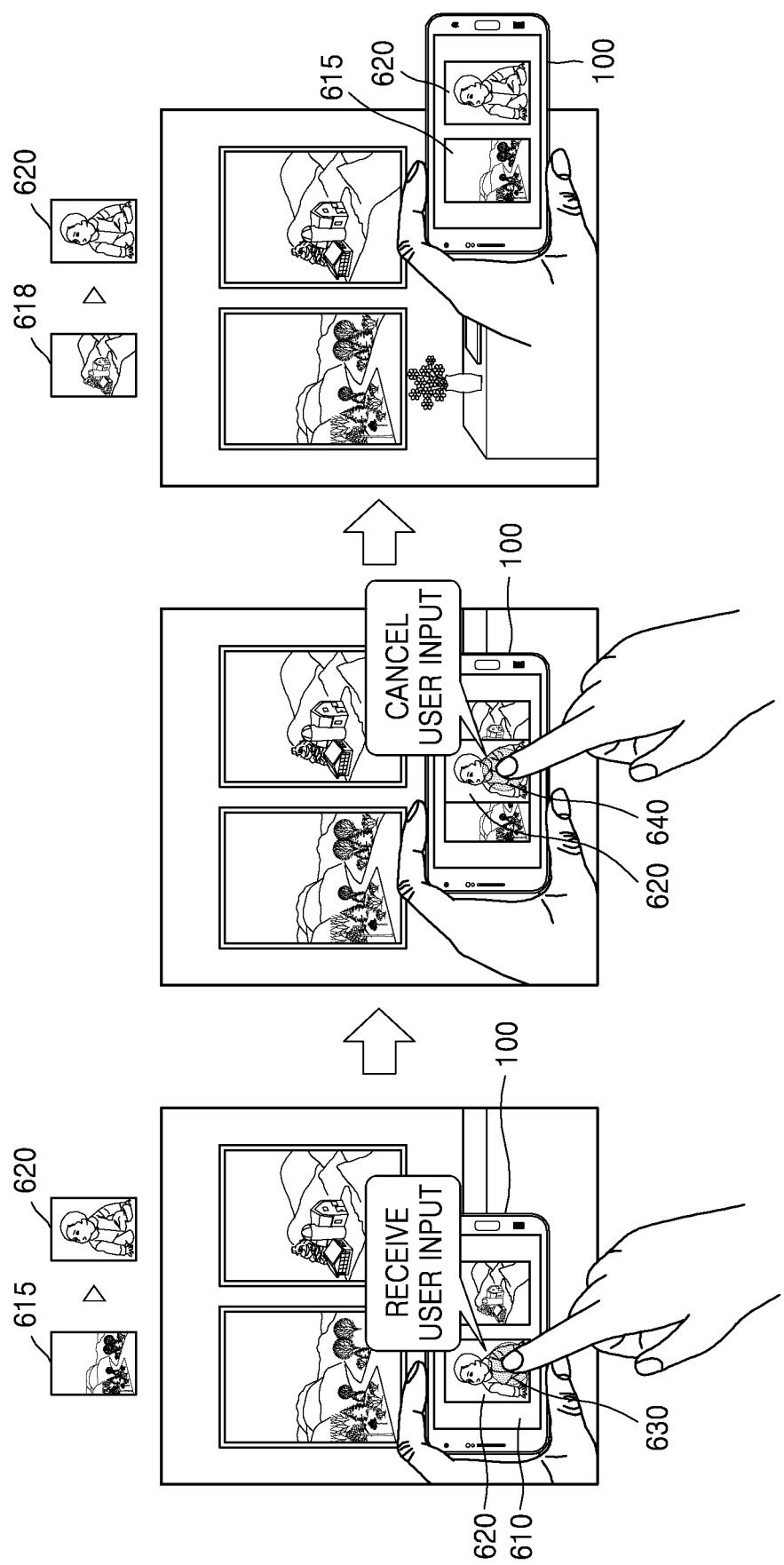
FIG. 6 is a diagram illustrating a method, performed by a device, of changing a marker in a scene, according to an embodiment.

FIG. 6 is a diagram illustrating a method performed by the device 100 of changing a marker 615 in a scene 610 according to an embodiment.

Referring to FIG. 6, the device 100 may identify the marker 615 in the recognized scene 610. When the marker 615 is identified, the device 100 may obtain an AR object 620 that is mapped to the recognized scene 610. Accordingly, the device 100 may overlap and display the AR object 620 on the marker 615.

The device 100 according to an embodiment may receive a long press touch input 630 on the AR object 620 from a user in a state where the AR object 620 is displayed. The device 100 may set a mode of the device 100 to a mapping change mode when the long press touch input 630 is received on the AR object 620.

In the mapping change mode, the AR object 620 may move based on a position of a user input. For example, when a drag input is continuously received after the long press touch input 630 is received, the AR object 620 may move along a position where the drag input 640 is received.

Meanwhile, the device 100 may determine a new marker based on a position of a drag input at a time when the drag input is released 640. For example, the device 100 may determine a second frame 618 which is an actual object corresponding to the release position of the drag input as the new marker. Thereafter, when the device 100 provides an AR service, and the second frame 618 is recognized, the AR object 620 may be overlapped and displayed on a position corresponding to the second frame 618.

Figure 7:
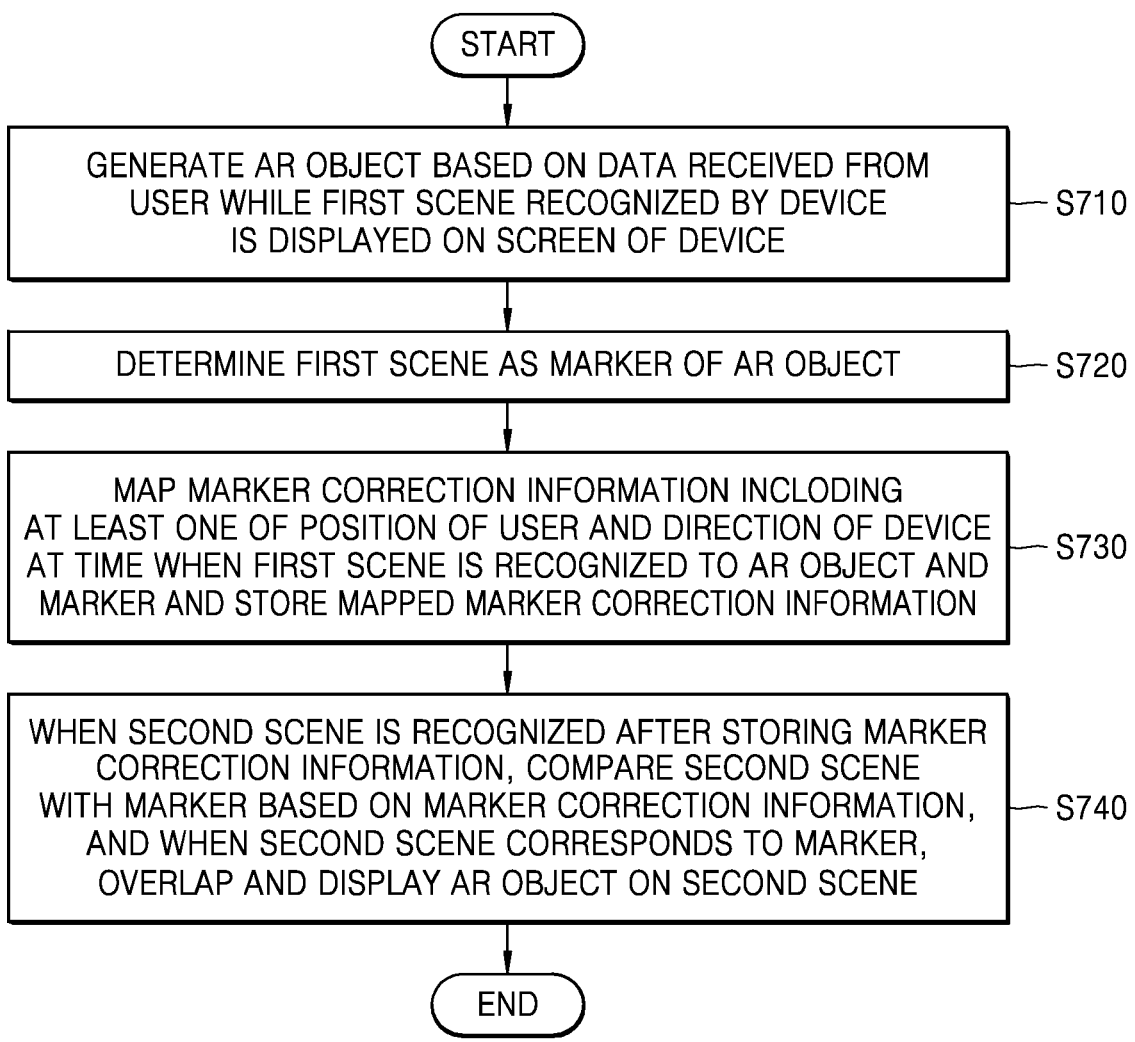
FIG. 7 is a flowchart illustrating a method, performed by a device, of recognizing a marker based on marker correction information and providing an AR object generated by a user, according to an embodiment.

FIG. 7 is a flowchart illustrating a method performed by a device of recognizing a marker based on marker correction information and providing an AR object generated by a user according to an embodiment.

In operation S710, the device may generate the AR object based on data received from the user while a recognized first scene is displayed on a screen of the device.

The device according to an embodiment may receive at least one of handwriting data, voice data of the user, images, music, text, and video from the user while the first scene is displayed on the screen. However, this is only an example, and the data that may be received from the user is not limited to the above example.

Also, the device may generate the data received from the user as the AR object with respect to the first scene.

In operation S720, the device may determine the first scene as a marker of the AR object.

When the AR object is generated based on the data received from the user, the device may determine the first scene as the marker of the AR object to map the AR object to the first scene. However, this is only an example, and an actual object included in the first scene may be determined as the marker of the AR object.

In operation S730, the device may map the marker correction information including at least one of a position of the user and a direction of the device at a time when the first scene is recognized to the AR object and the marker and store the mapped marker correction information.

The device according to an embodiment may obtain information about the position of the user and the direction of the device at the time when the first scene is recognized, and the like. When the first scene is used as the marker, since different scenes may be obtained based on the position of the user and the direction of the device, even though the device recognizes the same object as the first scene, it may be difficult to identify the marker. Accordingly, to increase the marker recognition rate, the device may obtain the information about the position of the user and the direction of the device at the time when the first scene is recognized, and the like, as the marker correction information.

In operation S740, since a second scene is recognized after storing the marker correction information, as a result of comparing the second scene with the marker based on the marker correction information, when the second scene corresponds to the marker, the device may overlap and display the AR object on the second scene.

When comparing the subsequently recognized second scene with the marker, to increase the accuracy, the device may compare the second scene with the marker in consideration of the position of the user and the direction of the device, and the like upon recognizing the first scene used as the marker.

When the second scene corresponds to the marker as a result of the comparison, the device may overlap and display the AR object mapped on the basis of the marker on the second scene.

Figure 8:
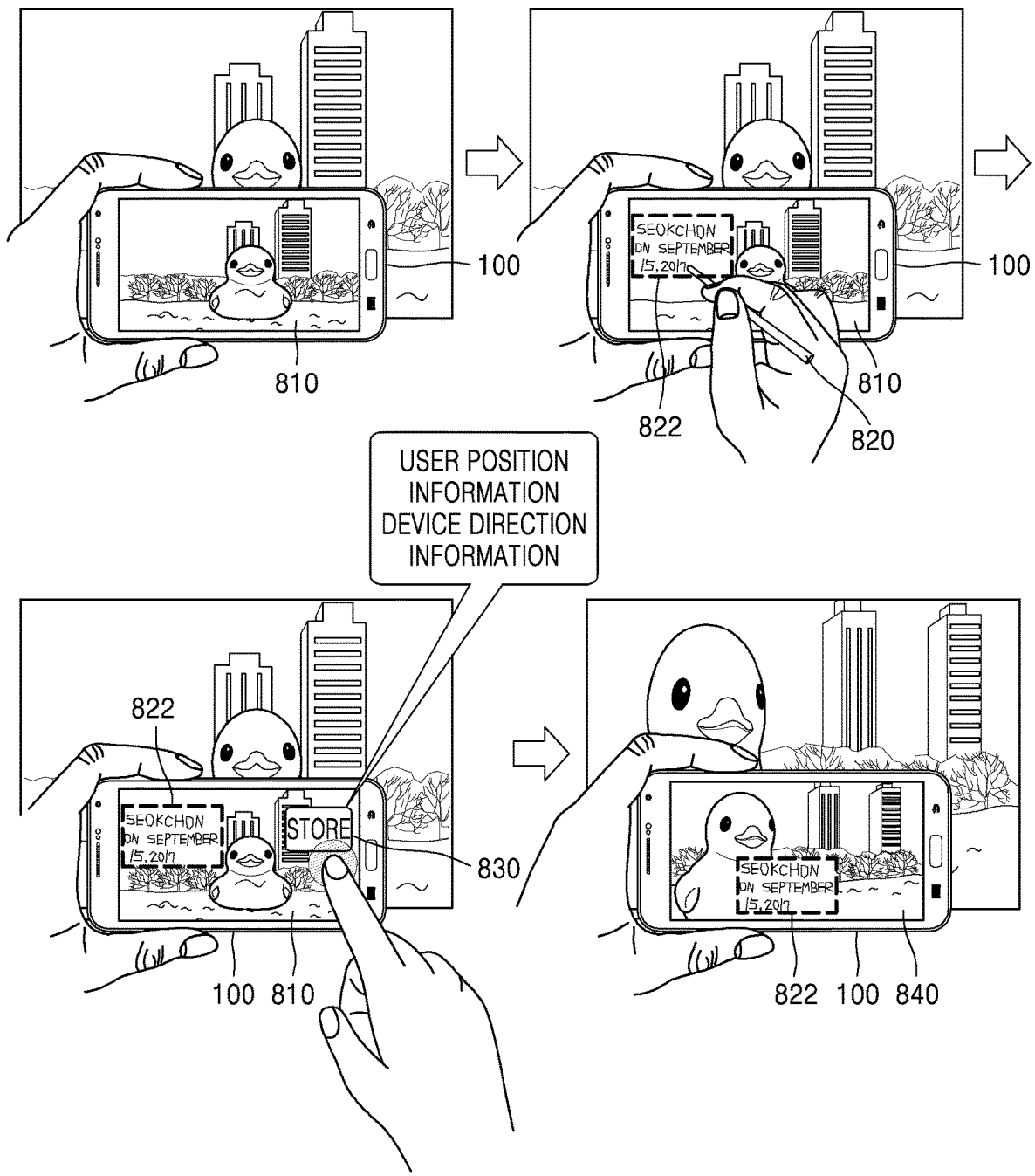
FIG. 8 is a diagram illustrating a method, performed by a device, of recognizing a marker based on marker correction information and providing an AR object generated by a user, according to an embodiment.

FIG. 8 is a diagram illustrating a method performed by the device 100 of recognizing a marker based on marker correction information and providing an AR object 822 generated by a user according to an embodiment.

Referring to FIG. 8, the device 100 may display a first scene 810 captured in a b direction (e.g., an orientation direction of the device) at a position of a lake a on a screen. Here, it is assumed that the device 100 operates in a preview mode in which a recognized scene around the device 100 is displayed on the screen.

A user may input handwriting data through an input device 820 on the screen of the device 100 on which the first scene 810 is displayed. For example, the user may input handwriting data "Seokchon Lake on Sep. 15, 2017" using the input device 820 such as a pen on the screen of the device 100. The device 100 may generate the handwriting data input from the user as the AR object 822 with respect to the first scene 810. Also, the device 100 may determine the first scene 810 as the marker with respect to the AR object 822.

Meanwhile, the device 100 according to an embodiment may obtain a position of the user and direction information of the device 100 at a time when the first scene 810 is recognized as the marker correction information. For example, the device 100 may obtain, as the marker correction information, information that the position of the user at the time when the first scene 810 is recognized is Seokchon Lake and a direction of 3 o'clock. When the user touches a save (e.g., store) button 830, the device 100 may determine that data input is completed and obtain the marker correction information. Also, the device 100 may map and store the marker correction information to the marker and the AR object 822 as the first scene 810.

When the second scene 840 is recognized after storing the marker correction information, the device 100 may compare the first scene 810 and the second scene 840 corrected based on the marker correction information and determine whether the scene 810 and the second scene 840 are results of recognizing the same object. For example, when the direction of the device 100 is different from the direction at the time when the first scene 810 is recognized even though the second scene 840 is the same scene as Seokchon Lake, the device 100 may not identify that the first scene 810 and the second scene 840 are results of recognizing the same object. Accordingly, the device 100 may compare the second scene 840 and the first scene 810 in consideration of the direction of the device 100 at the time when the first scene 810 is recognized.

When it is determined that the first scene 810 and the second scene 840 are results of recognizing the same object, the device 100 may overlap and display the AR object 822 generated based on the previous handwriting data of the user on the second scene 840.

Figure 9:
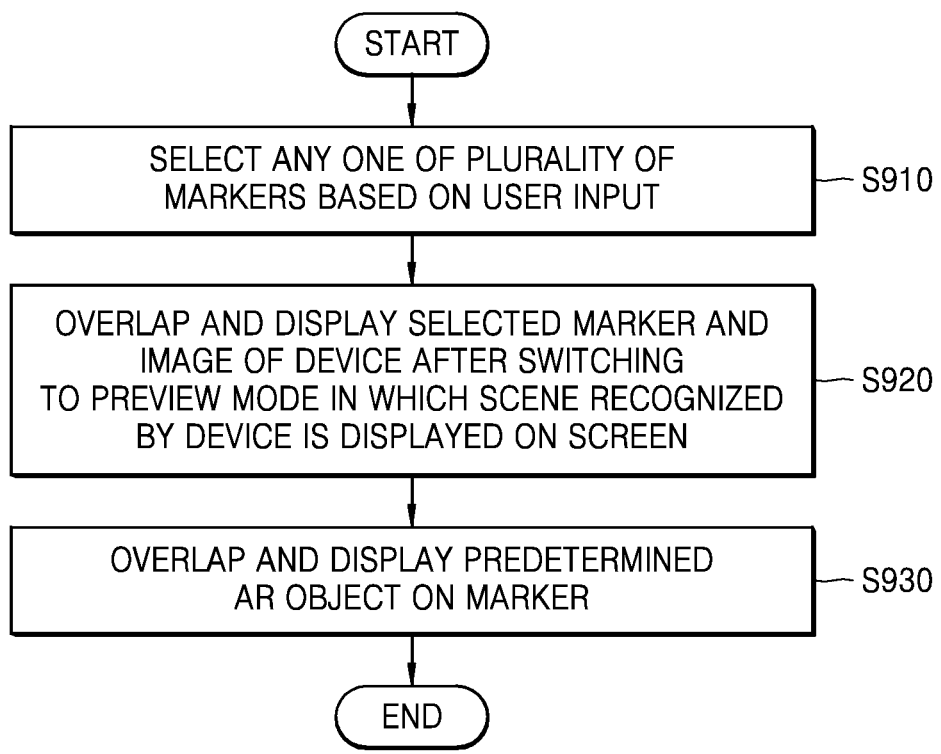
FIG. 9 is a flowchart illustrating a method, performed by a device, of providing information about an AR object corresponding to a marker, according to an embodiment.

FIG. 9 is a flowchart illustrating a method performed by a device of providing information about an AR object corresponding to a marker according to an embodiment.

In operation S910, the device may select any one of a plurality of markers based on a user input.

The device according to an embodiment may store the plurality of markers. Each of the plurality of markers may store mapping information between an actual object in a scene that may be recognized by the device and the AR object.

The device may display information about the plurality of stored markers on a screen. For example, the device may display a thumbnail image representing each of the plurality of markers in a list form on the screen. According to another example, the device may arrange names of the markers set upon generating the markers on the screen of the device.

A user may select information of a marker that the user wants to check from among the information about the plurality of markers displayed on the screen. For example, the user may select any one of the plurality of markers by touching a thumbnail image of the marker that the user wants to check or the name of the marker.

In operation S920, the device may overlap and display the selected marker on the screen after switching to a preview mode in which a recognized scene is displayed on the screen.

The device according to an embodiment may switch to the preview mode to provide the user with the same environment as an environment where an actual AR service is provided to the user when any one of the plurality of markers is selected. The preview mode may indicate a mode in which the scene recognized by the device is displayed on the screen.

When the device switches to the preview mode, the selected marker may be overlapped and displayed on the scene displayed on the screen. For example, when the user selects a frame including a New York travel photo as the marker, the device may overlap and display the frame including the New York travel photo on the screen in a situation where the recognized scene is displayed on the screen.

In operation S930, the device may overlap and display a predetermined AR object on the marker.

The device according to an embodiment may overlap and display the predetermined AR object on the marker in response to a user request. Here, the user request may be received in various forms. For example, when a user input for dragging an AR image of an additionally provided device is received while the marker is displayed, the device may overlap and display the AR object on the marker since the AR image of the device is displayed on the screen. This will be described later in more detail with reference to FIG. 10.

However, this is an example only, and a form of the user input that the user has to provide to display the AR object on the selected marker is not limited to the above-described form. According to another example, after the marker is displayed in the preview mode, the user may touch the marker such that the AR object is overlapped and displayed on the marker.

Figure 10:
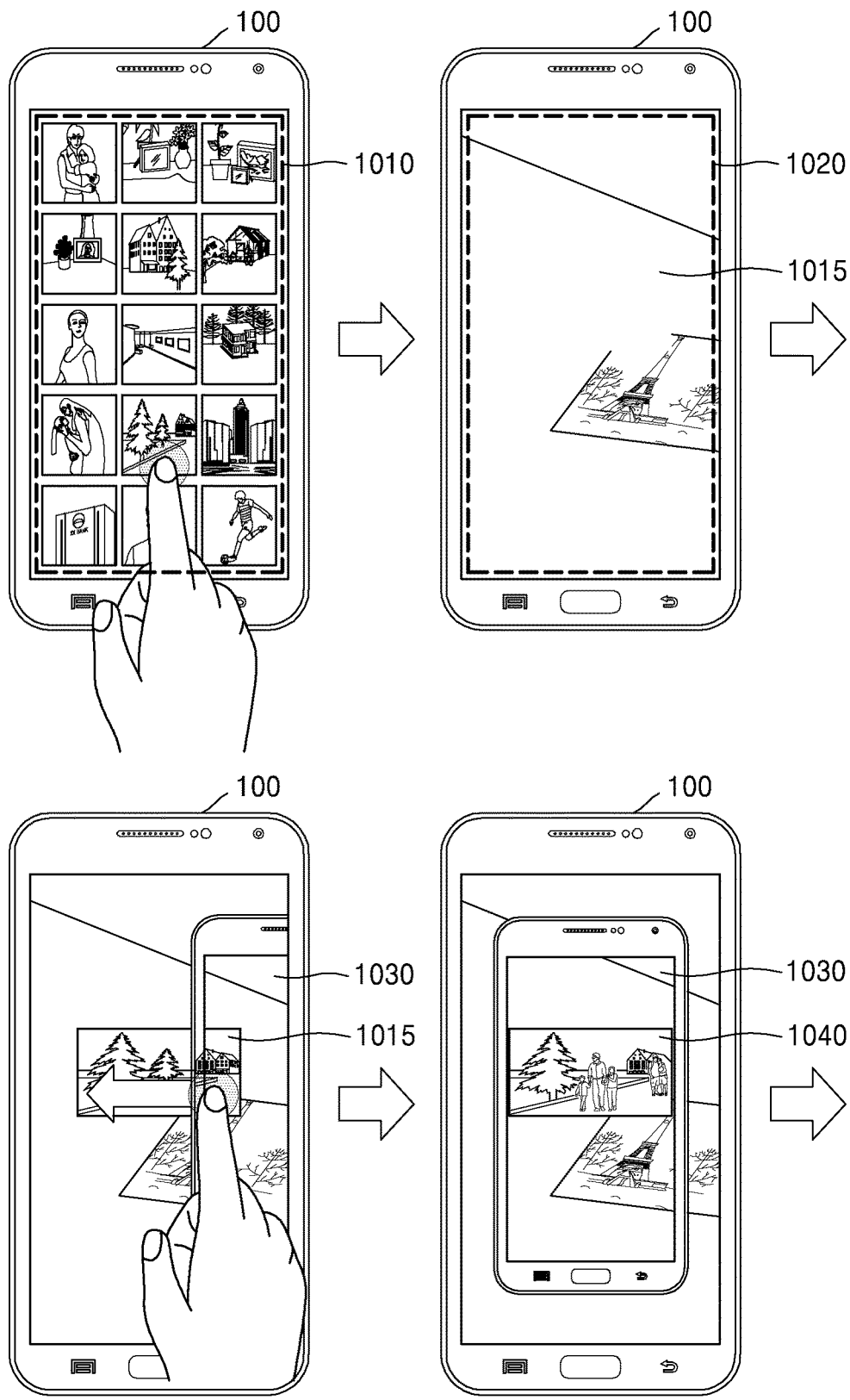
FIG. 10 is a diagram illustrating a method, performed by a device, of providing information about an AR object corresponding to a marker, according to an embodiment.

FIG. 10 is a diagram illustrating a method performed by the device 100 of providing information about an AR object corresponding to a marker 1015 according to an embodiment.

Referring to FIG. 10, the device 100 may display a list 1010 displaying thumbnail images of a plurality of markers on the screen. The device 100 may receive a user input that selects any of the thumbnail images of the plurality of markers. In the present embodiment, it is assumed that the marker H 1015 among the plurality of markers is selected based on the user input.

When the marker H 1015 is selected, the device 100 may switch to a preview mode. When switching to the preview mode, the device 100 may display a scene 1020 of a real world recognized by the device 100 in real time. Also, the device 100 may overlap and display the selected marker H 1015 on a scene 1020 displayed in the preview mode.

Meanwhile, the device 100 may display a part of an AR image 1030 of the device 100 on one side of the screen of the device 100 when the selected marker H 1015 is overlapped and displayed. In the present embodiment, when a user input for dragging the AR image 1030 of the device 100 is received, the device 100 may determine that the user requests an indication of the AR object corresponding to the selected marker H 1015.

The device 100 may overlap and display a predetermined AR object 1040 with respect to the marker H 1015 on the scene 102 displayed in the preview mode when the user input for dragging a part of the AR image 1030 of the device 100 is received.

Accordingly, the user may previously confirm the AR object corresponding to each of the plurality of markers previously generated in the device 100 before recognizing an actual scene.

Figure 11:
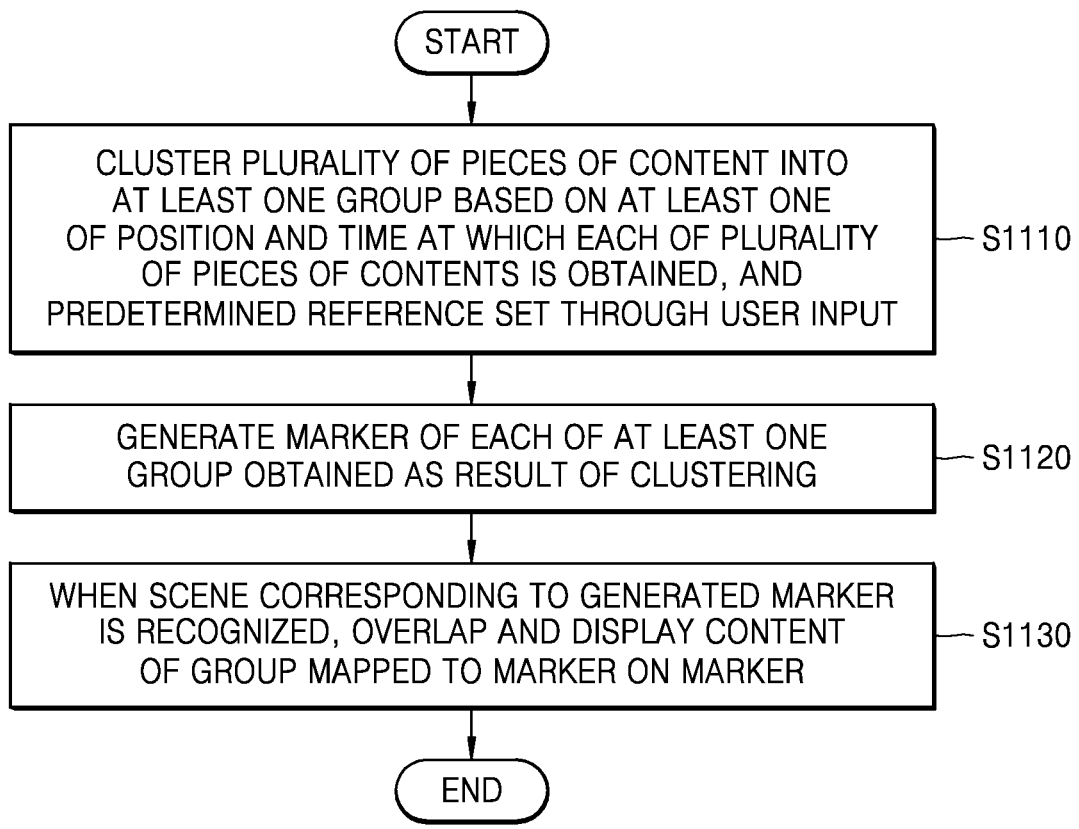
FIG. 11 is a flowchart illustrating a method, performed by a device, of generating an AR object and a marker for mapping the AR object to a scene based on previously stored content, according to an embodiment.

FIG. 11 is a flowchart illustrating a method performed by a device of generating an AR object and a marker for mapping the AR object to a scene based on previously stored content according to an embodiment.

In operation S1110, the device may cluster a plurality of pieces of content into at least one group based on at least one of a position and a time at which each of the plurality of pieces of contents is obtained, and a predetermined reference set through a user input. Here, the content may include at least one of image, voice, music, handwriting information, text, and moving images.

For example, the device may cluster a plurality of images into an image captured at a location A and an image captured at a location B or into an image captured on an anniversary or an image captured on a specific date. According to another example, the device may cluster the plurality of images based on an optical reference set by the user. However, this is only an example, and the content that is a clustering target is not limited to the image. According to another example, the device may cluster voice, music, handwriting information, text, and moving images or may cluster content in combination of two or more of the above-described components.

In operation S1120, the device may generate a marker of each of the at least one group obtained as a result of clustering.

The device according to an embodiment may select any one of content included in each of the at least one group as the marker. For example, the device may select any one of the content included in the group as the marker based on a user input. The device according to another embodiment may combine the content included in each of the at least one group to generate the marker of each of the at least one group. For example, the device may combine images within a group such that all the images included in the group may be included in one image. According to another example, the device may overlap and generate not only the content included in the group, but also an optional object selected by the user as the marker.

In operation S1130, when a scene corresponding to the generated marker is recognized, the device may overlap and display content of a group mapped to the marker on the marker.

The device according to an embodiment may determine the group mapped to the marker when the scene corresponding to the marker is present among subsequently recognized scenes. For example, the device may determine a group mapped to a China travel photo when the recognized scene includes the China travel photo that is one of the markers.

The device may overlap and display another Chinese travel photo included in the determined group on the marker. For example, the device may combine other Chinese travel photos included in the determined group in a moving image form and overlap and display the combined Chinese travel photo on the marker.

Figure 12:
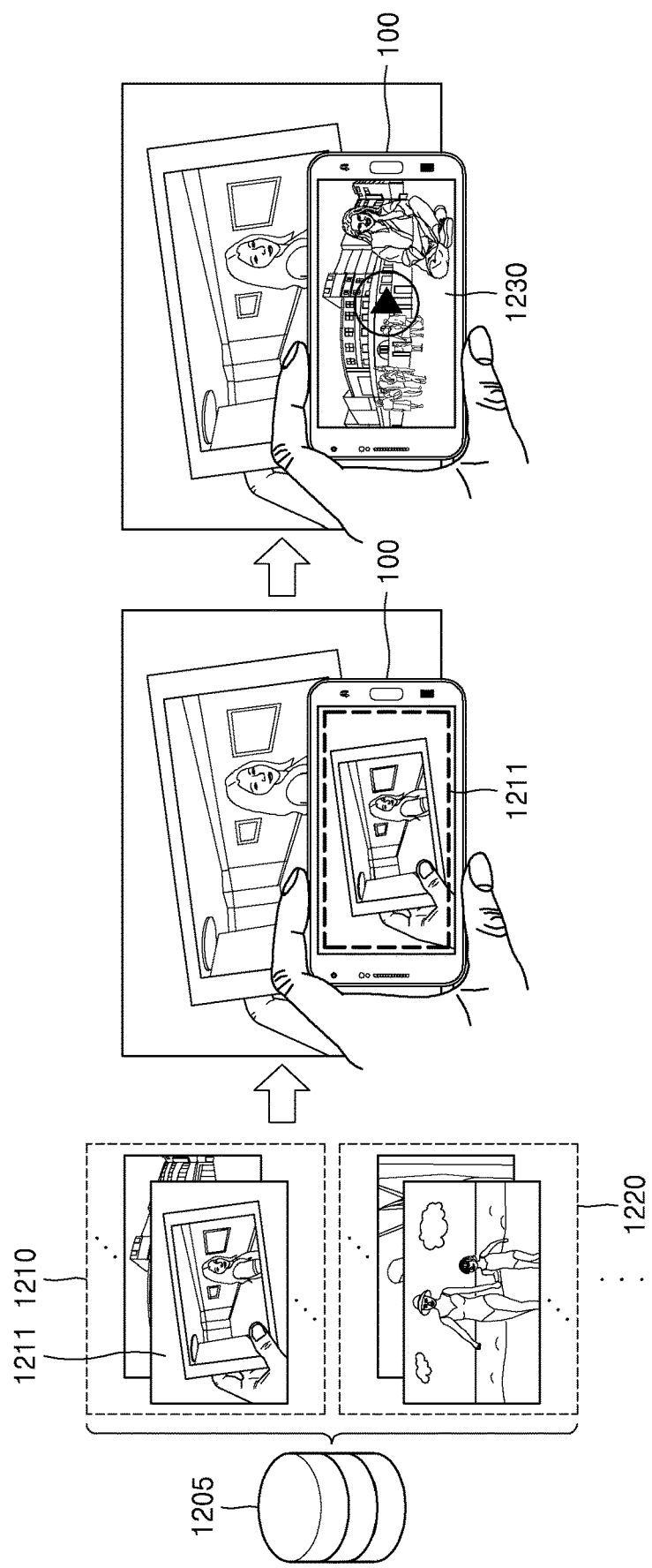
FIG. 12 is a diagram illustrating a method, performed by a device, of generating an AR object and a marker for mapping the AR object to a scene based on previously stored content, according to an embodiment.

FIG. 12 is a diagram illustrating a method performed by the device 100 of generating an AR object and a marker for mapping the AR object to a scene based on previously stored content according to an embodiment.

Referring to FIG. 12, the device 100 may cluster a plurality of images previously stored in a database 1205 into a plurality of groups 1210 and 1220 according to at least one of a time and a position at which the images are obtained. Also, the device 100 may generate the marker using at least one of the images included in the plurality of groups 1210 and 1220. For example, the device 100 may determine a first image 1211 included in a first group 1210 as the marker with respect to the image included in the first group 1210. Here, the device 100 may arbitrarily determine an image to be the marker or may determine an image to be the marker based on a user input.

When the device 100 recognizes the scene, the device 100 may determine whether the recognized scene corresponds to any of markers in the clustered groups 1210 and 1220. When the recognized scene corresponds to the first image 1211 which is the marker of the first group 1210 as a result of determination, the device 100 may provide a moving image 1230 including the images included in the first group 1210 as the AR object with respect to the marker that is the first image 1211. Accordingly, the device 100 may overlap and display the moving image 1230 including the images included in the first group 1210 on the first image 1211 that is the marker.

Meanwhile, FIG. 12 illustrates a method of generating the AR object based on the image as an example of content, but this is merely an example, and the content is not limited to the image.

Figure 13:
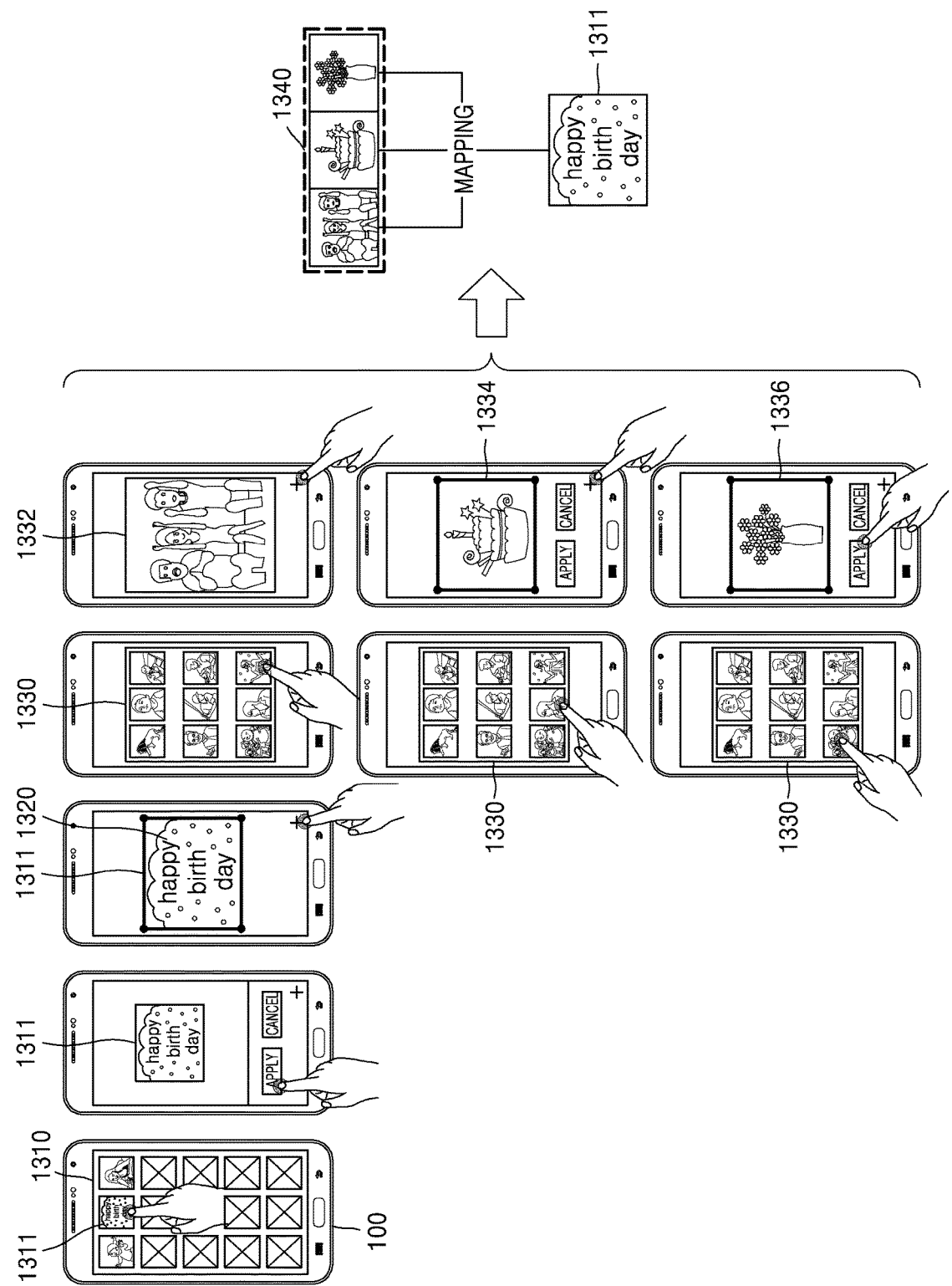
FIG. 13 is a diagram illustrating a method, performed by a device, of generating a marker and an AR object corresponding to the marker based on a user input, according to an embodiment.

FIG. 13 is a diagram illustrating a method performed by the device 100 of generating a marker and an AR object 1340 corresponding to the marker based on a user input according to an embodiment.

Referring to FIG. 13, the device 100 may select an image to be used as the marker based on the user input from a list 1310 of a plurality of previously stored images. For example, the device 100 may select a birthday card photo 1311 as the marker from the list 1310 of the previously stored images.

Also, the device 100 may provide a user interface (UI) 1320 for editing the selected marker. A user may edit size, color, etc. of the birthday card photo 1311 selected as the marker through the UI 1320.

After selecting the marker, the device 100 may generate the AR object 1340 to be mapped to the marker based on the user input. The device 100 may display a list 1330 of a plurality of images that may be used as AR objects on a screen. The device 100 may select a first image 1332, a second image 1334, and a third image 1336 based on the received user input from the displayed list 1330. The device 100 may store the plurality of selected images 1332, 1334, and 1336 as the AR object 1340 mapped to the birthday card photo 1311.

Meanwhile, the device 100 may provide the generated AR object 1340 to another device. For example, the user may transmit the AR object 1340 mapped to the birthday card photo 1311 to a device of the other user whose birthday is today, thereby providing an AR service that the AR object 1340 is overlapped and displayed on the birthday card photo 1311 when the birthday card photo 1311 is recognized by the device of the other user. The device 100 may also provide AR content generated by mapping the AR object 1340 to the birthday card photo 1311 to another device located within a predetermined distance range using an NFC tag or the like, thereby more easily sharing the AR content with the other device.

According to another embodiment, the device 100 may register the AR content generated as a result of mapping the AR object 1340 to the birthday card photo 1311 to an external server. For example, the device 100 may register the AR content to a cloud server or a store server accessible by other users.

The device 100 may register the AR content according to a file format defined to include all information about the marker and the AR object 1340 included in the AR content. For example, the device 100 may register the AR content according to the file format that defines an identifier of the birthday card photo 1311 and mapping information such as the latitude and longitude of the AR object 1340 overlapped and displayed with respect to the birthday card photo 1311.

Figure 14:
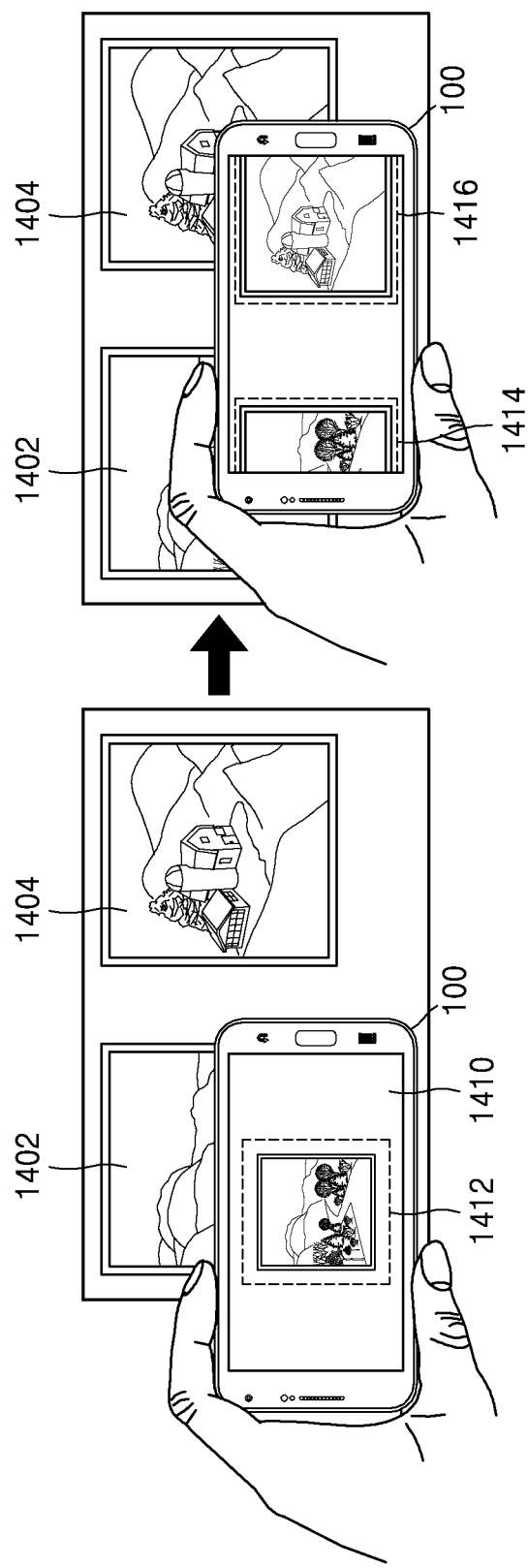
FIG. 14 is a diagram illustrating a method, performed by a device, of recognizing a marker when moving, according to an embodiment.

FIG. 14 is a diagram illustrating a method performed by the device 100 of recognizing a marker when moving according to an embodiment.

Referring to FIG. 14, the device 100 may determine whether a specific object 1402 is the marker in a recognized scene 1410 when the specific object 1402 is captured. When it is determined that the specific object 1402 corresponds to a predetermined first marker 1412, the device 100 may overlap and display an AR object mapped to the first marker 1412 on the recognized scene 1410.

Meanwhile, when the device 100 moves based on movement of a user, the device 100 may recognize a scene including a plurality of objects 1402 and 1404. The device 100 may determine whether a marker corresponding to each of the plurality of objects 1402 and 1404 is present such that the AR object displayed according to the movement of the user changes.

The device 100 may compare areas of respective markers 1414 and 1416 included in the scene when the marker corresponding to each of the plurality of objects 1402 and 1404 is present. When the area of the second marker 1416 included in the scene is greater than the area of the first marker 1414 included in the scene as a result of comparison, the device 100 may overlap and display an AR object mapped to the second marker 1416 on the recognized scene.

Figure 15:
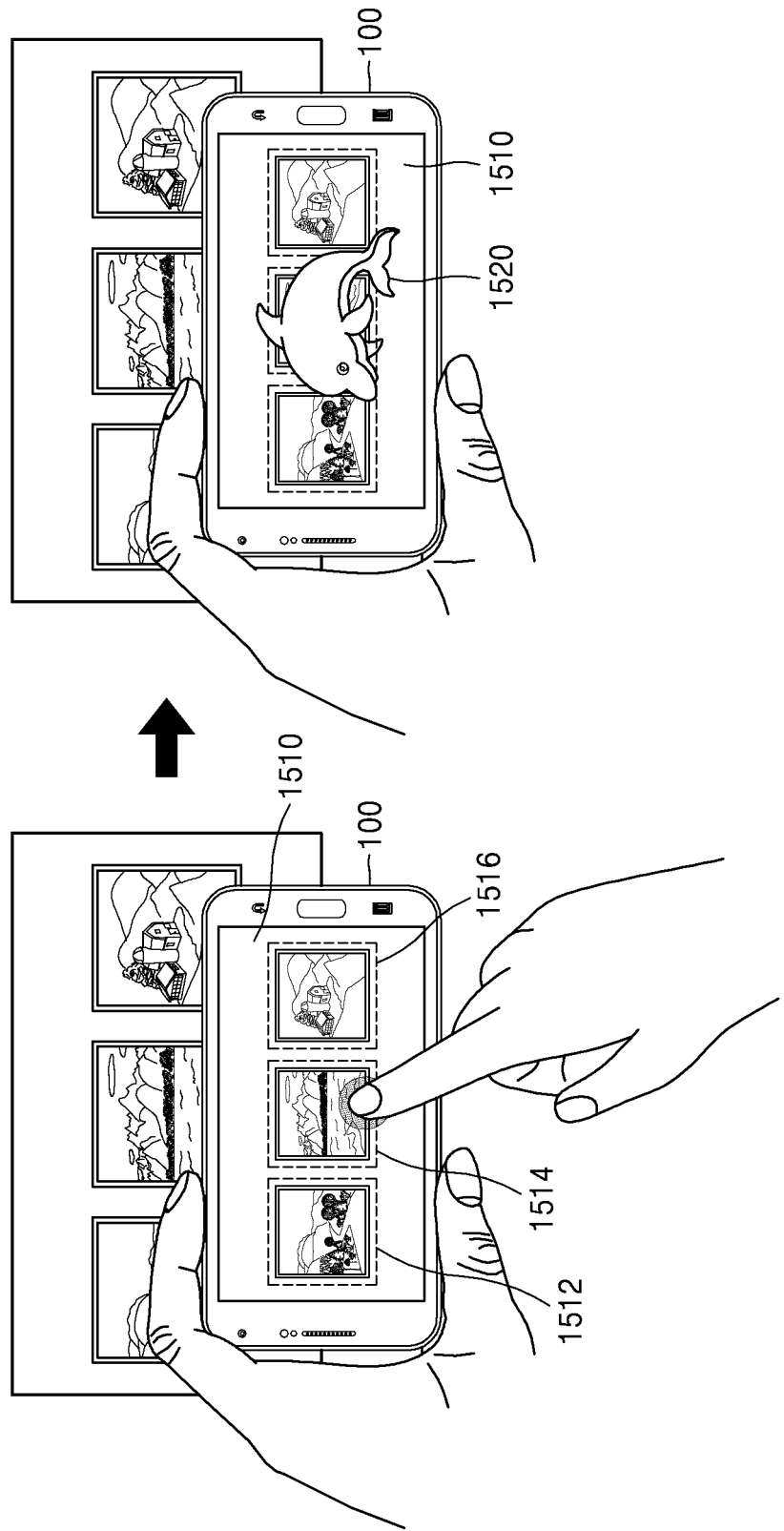
FIG. 15 is a diagram illustrating a method, performed by a device, of selecting any one of a plurality of markers according to a user input, according to an embodiment.

FIG. 15 is a diagram illustrating a method performed by the device 100 of selecting any one of a plurality of markers 1512, 1514, and 1516 according to a user input according to an embodiment.

Referring to FIG. 15, the device 100 may recognize a scene including a plurality of objects. The device 100 may determine whether each of the plurality of objects included in the recognized scene is a marker.

When the first marker 1512, the second marker 1514, and the third marker 1516 respectively corresponding to the plurality of objects are present, the device 100 according to an embodiment may display identification marks around the markers 1512, 1514, and 1516 such that a user may recognize all the recognized markers 1512, 1514, and 1516. For example, the device 100 may display dotted line marks on edges of the first marker 1512, the second marker 1514, and the third marker 1516.

The user may recognize the plurality of markers 1512, 1514 and 1516 included in the scene through the identification marks and select any one of the plurality of recognized markers 1512, 1514 and 1516. For example, the user may touch and select the second marker 1514 from among the plurality of markers 1512, 1514, and 1516.

Also, the device 100 may overlap and display an AR object 1520 corresponding to the second marker 1514 selected by the user on the recognized scene 1510.

Figure 16:
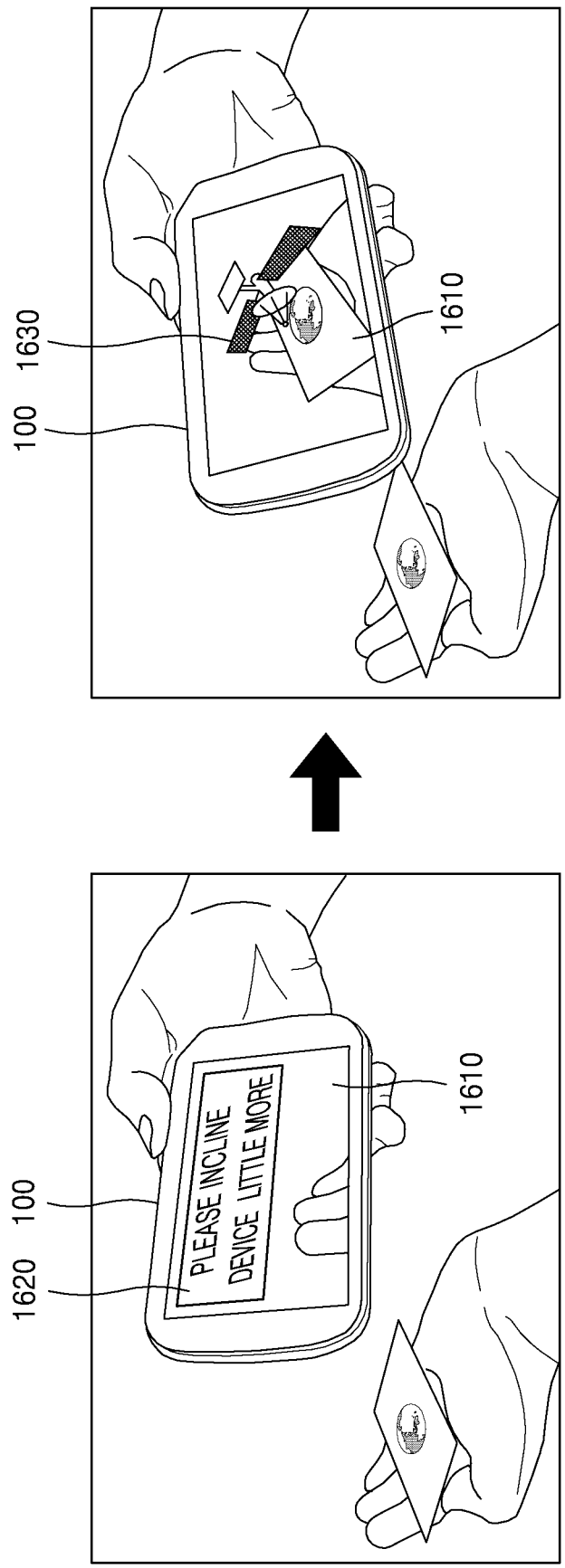
FIG. 16 is a diagram illustrating a method, performed by a device, of providing guide information for recognizing a marker to a user, according to an embodiment.

FIG. 16 is a diagram illustrating a method performed by the device 100 of providing guide information 1620 for recognizing a marker to a user according to an embodiment.

Referring to FIG. 16, when registering the marker, the device 100 may provide the guide information 1620 to the user in a case where a currently recognized scene 1610 does not satisfy the marker registration condition. For example, the device 100 may display the guide information 1620 including text requesting the user to tilt the device 100. Here, to determine whether the marker registration condition is satisfied, the device 100 may use state information of the device 100 obtained from various sensors provided in the device 100 such as illumination, a tilt sensor, and the like.

The device 100 may change the inclination of the device 100 according to the guide information 1620 and when the recognized scene 1610 satisfies the marker registration condition, may register an object included in the recognized scene 1610 as the marker. Also, the device 100 may overlap and display an AR object 1630 mapped to the registered marker on the recognized scene 1610 such that the user may check the AR object 1630 in advance.

Figure 17:
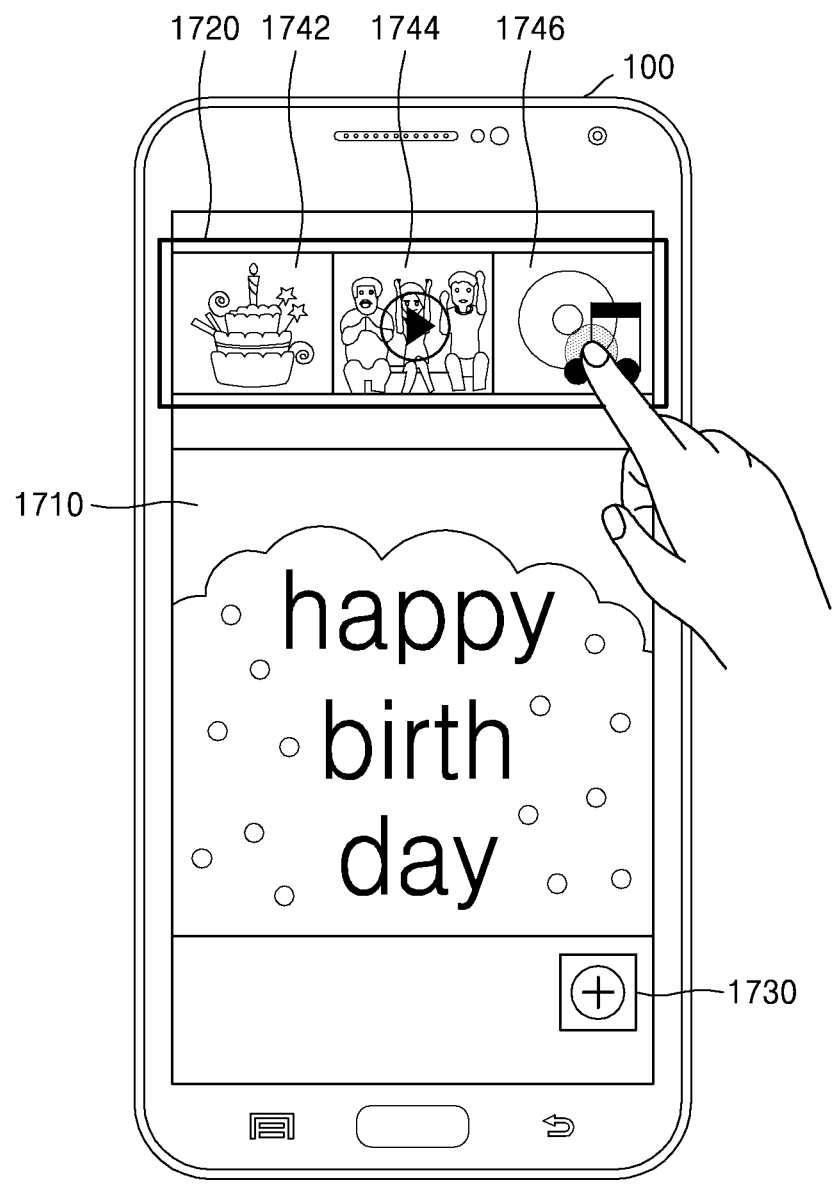
FIG. 17 is a diagram illustrating a method, performed by a device, of mapping one or more AR objects to a marker, according to an embodiment.

FIG. 17 is a diagram illustrating a method performed by the device 100 of mapping one or more AR objects 1742, 1744, and 1746 to a marker 1710 according to an embodiment.

Referring to FIG. 17, the device 100 may provide a user interface for registering an AR object corresponding to the marker 1710. For example, the device 100 may display the specified marker 1710 on a part of a screen.

The device 100 may also display an AR object editing region 1720 that displays the one or more AR objects 1742, 1744, and 1746 registered to be mapped to the current marker 1710 on an upper portion of a portion where the marker 1710 is displayed. The one or more AR objects 1742, 1744, and 1746 according to an embodiment may include various types of content such as image, moving image, music and text.

A user may edit the one or more AR objects 1742, 1744, and 1746 displayed on the AR object editing region 1720. In an embodiment, the user may touch and drag one of the one or more AR objects 1742, 1744, and 1746 displayed on the AR object editing region 1720 such that an order in which the one or more AR objects 1742, 1744, and 1746 are output is changed. For example, when the user drags the first AR object 1742 and changes positions of the first AR object 1742 and the second AR object 1744, the second AR object 1744 may be output prior to the first AR object 1742. Accordingly, after the second AR object 1744 which is a moving image is output, the first AR object 1742 which is an image may be output.

However, this is only an example, and at least some of the one or more AR objects 1742, 1744, and 1746 displayed on the AR object editing region 1720 of the device 100 may be set to be overlapped and output. For example, according to the setting of the user, the third AR object 1746 which is a music file may be overlapped and output on the first AR object 1742 and the second AR object 1744. Accordingly, while the first AR object 1742 which is the image and the second AR object 1744 which is the moving image are output, the third AR object 1746 may be overlapped and output as background music.

The device 100 may also add and register an AR object other than the one or more AR objects 1742, 1744, and 1746 currently mapped to the marker 1710. The user may check information about the AR object that may additionally be mapped to the marker 1710 by selecting an add button 1730 displayed on the screen of the device 100. For example, when the add button 1730 is selected, the device 100 may display a thumbnail image such as an image or a moving image registered in a photo album application on the screen. However, this is only an example, and when the add button 1730 is selected, the device 100 may display information about another content such as a music file.

Figure 18:
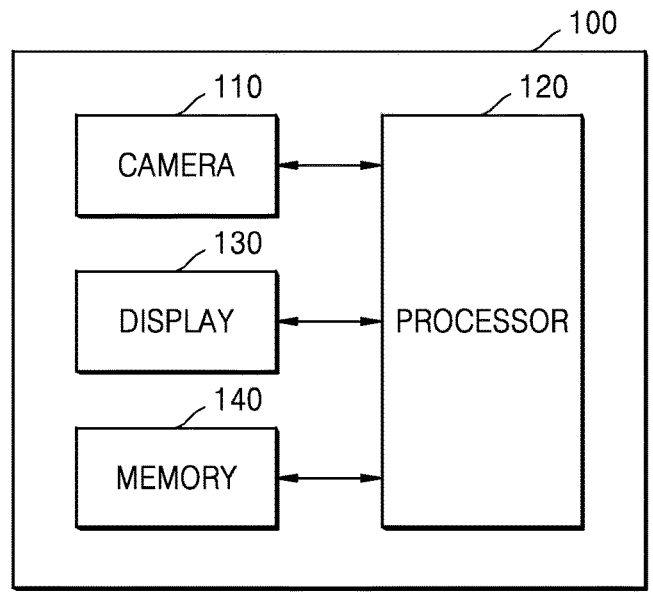
FIGS. 18 and 19 are block diagrams illustrating a device according to an embodiment.
Figure 19:
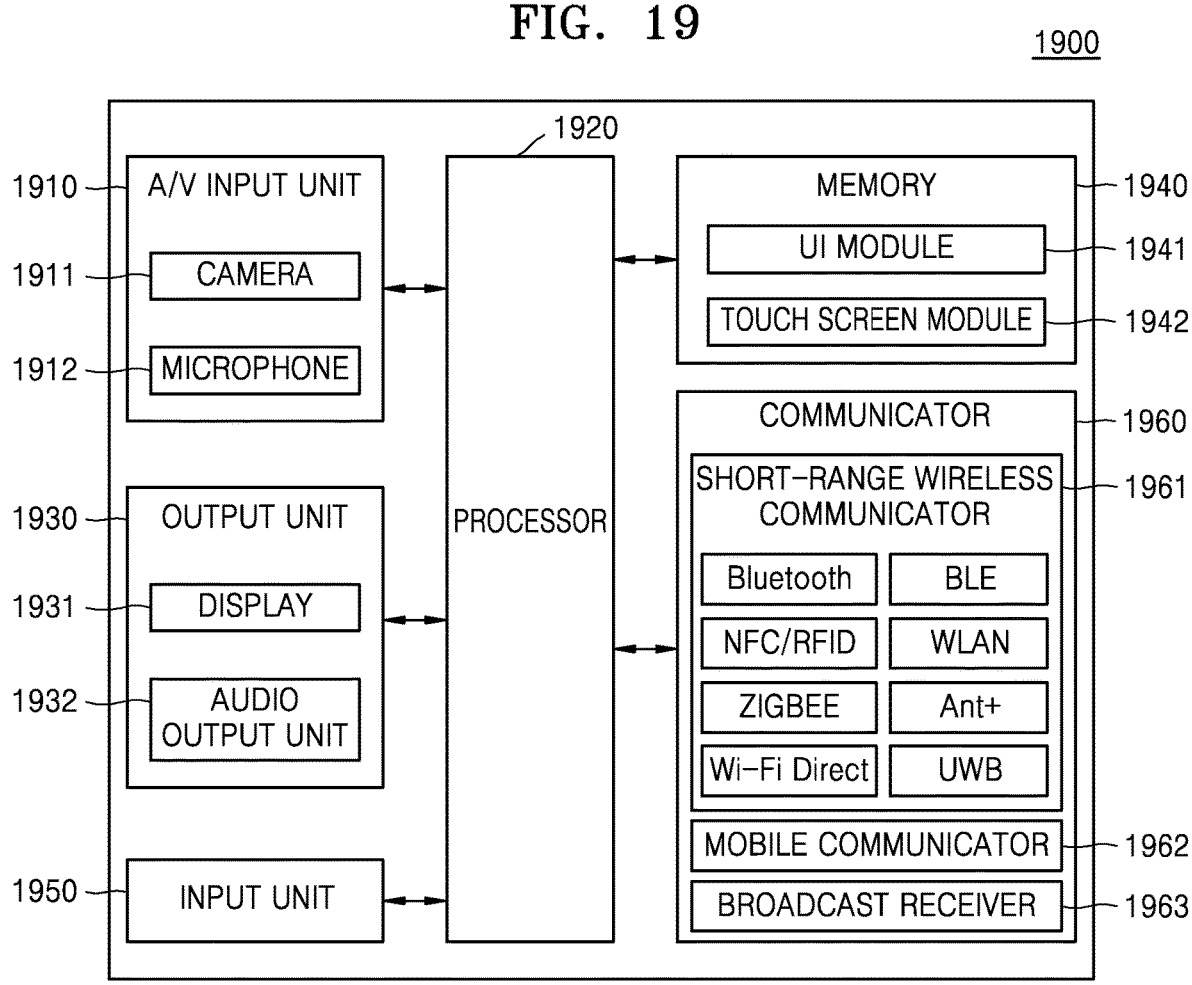

FIGS. 18 and 19 are block diagrams illustrating the device 100 according to an embodiment.

Referring to FIG. 18, the device 100 according to an embodiment may include a camera 110, at least one processor (e.g., including processing circuitry) 120, a display 130, and a memory 140. However, all illustrated components are not indispensable components. The device 100 may be implemented by more components than the components shown in FIG. 18, and the device 100 may be implemented by fewer components than the components shown in FIG. 18.

For example, Referring to FIG. 19, a device 1900 according to an embodiment may further include an input unit (e.g., including input circuitry) 1950 and a communicator (e.g., including communication circuitry) 1960, in addition to a camera 1911, a processor (e.g., including processing circuitry) 1920, an output unit (e.g., including output circuitry) 1930, and a memory 1940. Meanwhile, in the device 1900 of FIG. 19, the camera 1911, the processor 1920, the display 1931, and the memory 1940 may correspond to the camera 110, the processor 120, the display 130, and the memory 140 of FIG. 18, respectively.

Hereinafter, the components will be described in order.

An audio/video (A/V) input unit 1910 may include various A/V input circuitry for inputting an audio signal or a video signal, and may include, for example, and without limitation, the camera 1911, a microphone 1912, or the like.

The camera 1911 may recognize a scene of a real world within a camera recognition range. The recognized scene may be captured as an image. The image captured by the camera 1911 according to an embodiment may be imaged by the processor 120 and displayed and output via the display 1931.

The microphone 1912 may receive the utterance voice of a user. The microphone 1912 may convert the received voice into an electric signal and output the electric signal to the processor 1920.

The processor 1920 may include various processing circuitry and may control the overall operation of the device 1900. For example, the processor 1920 may generally control the A/V input unit 1910, the output unit 1930, an input unit 1950, and a communicator 1960 by executing programs stored in the memory 1940.

The processor 1920 according to an embodiment may control the components to perform functions of the device 100 described above with reference to FIGS. 1 to 17 to provide an AR service.

For example, the processor 1920 may cluster a plurality of markers that are a reference for mapping an AR object to the scene recognized through the camera 1911 into at least one group according to the marker attribute. Also, the processor 1920 may determine any one of the plurality of clustered markers as a representative marker of each of the at least one group. When a representative marker corresponding to a first scene recognized by the device 1900 is identified among the representative marker of each of the at least one group, the processor 1920 may preferentially search for markers included in a group of the identified representative marker rather than other markers to identify a marker with respect to a second scene recognized after the first scene is recognized.

According to another example, the processor 1920 may generate an AR object based on data received from the user while the first scene recognized by the device 1900 is displayed on the screen of the device 1900. The processor 1920 may determine the first scene as a marker of the AR object. Also, the processor 1920 may map marker correction information including at least one of a position of the user and a direction of the device 1900 at the time when the first scene is recognized to the AR object and the marker and store the marker correction information. When the second scene is recognized after the marker correction information is stored, as a result of comparing the second scene with the marker based on the marker correction information, when the second scene corresponds to the marker, the processor 1920 may overlap and display the AR object on the second scene.

The output unit 1930 may include various output circuitry and output data in the form of an audio signal or a video signal. The output unit 1930 may include various output circuitry, such as, for example, and without limitation, the display 1931 and an audio output unit (e.g., including audio output circuitry) 1932.

In the present disclosure, the display 1931 may be used interchangeably with the screen in that the display 1931 displays a recognized scene.

The display 1931 may display and output information processed by the device 1900. For example, the display 1931 may overlap and display the AR object on the recognized scene. When the display 1931 and a touch pad have a layer structure and are configured as a touch screen, the display 1931 may be used as an input device in addition to an output device.

The audio output unit 1932 may include various audio output circuitry and output audio data received from the communicator 1960 or stored in the memory 1940.

The programs stored in the memory 1940 may be classified into a plurality of modules according to their functions, for example, a UI module 1941 and a touch screen module 1942.

The UI module 1941 may provide a specialized UI, a GUI, and the like that are synchronized with the device 1900 for each application. The touch screen module 1942 may detect a touch gesture on a touch screen of a user and may transmit information about the touch gesture to the processor 1920. The touch screen module 1942 according to some embodiments may recognize and analyze a touch code. The touch screen module 1942 may be configured as separate hardware including a controller.

The memory 1940 may include, for example, and without limitation, a storage medium of at least one type selected from a flash memory, a hard disk, a multimedia card type memory, a card type memory such as a secure digital (SD) or xD-Picture (xD) card memory, a random access memory (RAM), a static random access memory (SRAM), a read-only memory (ROM), an electrically erasable programmable read-only memory (EEPROM), a programmable read-only memory (PROM), a magnetic memory, a magnetic disc, an optical disc, or the like.

The input unit 1950 may include various input circuitry for the user to input data for controlling the device 1500. For example, the input unit 1950 may include, for example, and without limitation, a key pad, a dome switch, a touch pad (a contact capacitance type, a pressure resistive type, an infrared ray detection type, a surface ultrasonic wave conduction type, an integral tension measurement type, a piezo effect type, etc.), a jog wheel, a jog switch, or the like, but is not limited thereto.

According to an embodiment, the input unit 1950 may receive a user input that requests switching to an AR mode using the touchpad. However, this is only an example, and the input unit 1950 may receive a user input including handwriting information.

The communicator 1960 may include one or more components for communicating with an external server (e.g., a cloud server, a content providing server, etc.) and other external devices. For example, the communicator 1960 may include various communication circuitry, such as, for example, and without limitation, one or more of a short-range wireless communicator 1961, a mobile communicator 1962, a broadcast receiver 1963, or the like.

The short-range wireless communicator 1961 may include a Bluetooth communicator, a Bluetooth Low Energy (BLE) communicator, a Near Field communicator, a WLAN (WiFi) communicator, a Zigbee communicator, an infrared data association (IrDA) communicator, a Wi-Fi Direct (WFD) communicator, an ultra wideband (UWB) communicator, an Ant+ communicator, or the like, but is not limited thereto.

The mobile communicator 1962 transmits and receives a radio signal to and from at least one of a base station, an external terminal, and a server over a mobile communication network. Here, the radio signal may include various types of data according to content transmission and reception.

The broadcast receiver 1963 receives a broadcast signal and/or broadcast-related information from outside through a broadcast channel. The device 1900 may not include the broadcast receiver 1963 according to an embodiment.

The method according to an embodiment may be implemented as computer commands which may be executed by various computer means, and recorded on a non-transitory computer-readable recording medium. The non-transitory computer-readable recording medium may include program commands, data files, data structures, and/or any combination thereof. The program commands recorded on the non-transitory computer-readable recording medium may be specially designed and constructed for the present disclosure or may be known to and usable by one of ordinary skill in a field of computer software. Examples of the non-transitory computer-readable medium include magnetic media such as hard discs, floppy discs, or magnetic tapes, optical media such as compact disc-read only memories (CD-ROMs), or digital versatile discs (DVDs), magneto-optical media such as floptical discs, and hardware devices that are specially configured to store and carry out program commands, such as ROMs, RAMs, or flash memories. Examples of the program commands include a high-level programming language that may be executed by a computer using an interpreter as well as a machine language code made by a compiler.

The device described herein may include a processor, a memory for storing program data to be executed by the processor, a permanent storage such as a disk drive, a communication port for handling communications with external devices, and user interface devices including a touch panel, keys, buttons, etc. Methods implemented as software modules or algorithms may be stored as program commands or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media may be read by the computer, stored in the memory, and executed by the processor.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be understood to encompass all embodiments that would normally occur to one of ordinary skill in the art.

The disclosure may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the disclosure may employ any number of techniques for electronics configuration, signal processing and/or control, data processing and the like. The words "mechanism" and "element" are used broadly and are not limited to mechanical or physical embodiments, but may include software routines in conjunction with processors, etc.

The particular implementations illustrated and described herein are illustrative examples of the disclosure and are not intended to otherwise limit the scope of the disclosure in any way. For the sake of brevity, electronics, control systems, software development and other functional aspects of the systems (and components of the individual operating components of the systems) may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the disclosure (especially in the context of the following claims) are to be understood to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure.

It should be understood that the various example embodiments described herein should be considered in a descriptive sense only and not for purposes of limitation. Descriptions of features or aspects within each embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. A method of providing an augmented reality (AR) service, the method comprising:
   clustering a plurality of markers, each of the markers being a reference for mapping an AR object to a scene recognized by a device, into at least one group based on a marker attribute;
   determining any one of the plurality of clustered markers as a representative marker of each of the at least one group;

identifying a first group of markers including a representative marker corresponding to a first scene being recognized, among the at least one group;

in response to a second scene being recognized after the first scene, initially searching for markers included in the identified first group of markers for identifying a marker corresponding to the second scene, so that the searching for the marker corresponding to the second scene is initially performed based on the first group of markers that was identified in response to the first scene being recognized; and overlapping and displaying an AR object mapped to the second scene based on the identified marker.

2. The method of claim 1, wherein the plurality of markers comprise an actual object included in each of a plurality of scenes recognized by the device, and wherein the marker attribute comprises at least one of: a kind of the actual object, a time when the scene including the actual object is recognized by the device, and a position at which the scene including the actual object is recognized by the device, wherein the displaying comprises extracting an AR object corresponding to the identified marker from a previously stored mapping database when the marker is identified.

3. The method of claim 1, wherein the determining comprises determining a representative marker of each of the at least one group based on a user input for selecting any one of the plurality of clustered markers.

4. The method of claim 1, wherein the first scene and the second scene include images recognized in a preview mode of a camera application executed by the device.

5. The method of claim 1, further comprising:

clustering a plurality of pieces of content previously obtained by the device into at least one AR object group based on at least one of: a position at which each of the plurality of pieces of content is obtained, and a time when each of the plurality of pieces of content is obtained, and a predetermined reference based on a user input;

generating a marker of each of the at least one AR object group using at least one of the plurality of pieces of content; and overlapping and displaying content included in an AR object group mapped to the marker on the marker corresponding to the recognized scene when the scene recognized by the device corresponds to any one of the generated marker, wherein the plurality of pieces of content comprise at least one of: an image, voice, music, handwriting information, text, and a moving image.

6. The method of claim 1, further comprising:

separating the AR object from the marker when a predetermined type of user input is received with respect to the AR object overlapped and displayed on the marker in the scene recognized by the device; and overlapping and displaying the separated AR object on a predetermined position in at least one scene recognized by the device based on a position of the received user input.

7. A device comprising:
a memory storing one or more instructions;
a display;
a camera configured to recognize a scene around the device; and
a processor configured to execute the one or more instructions stored in the memory, wherein the processor, when executing the one or more instructions, causes the device to perform at least one operation to: cluster a plurality of markers, each of the markers being a reference for mapping an AR object to a scene recognized through the camera, into at least one group based on a marker attribute, determine any one of the plurality of clustered markers as a representative marker of each of the at least one group, identify a group including a representative marker corresponding to a first scene being recognized, among the at least one group, in response to a second scene being recognized after the first scene, search for markers included in the a group for identifying a marker corresponding to the second scene, in response to the marker being not identified in the group, search for another group for identifying the marker and overlap and display an AR object mapped to the second scene on the second scene based on the identified marker.

8. The device of claim 7, wherein the plurality of markers comprises an actual object included in each of a plurality of scenes recognized by the device, and wherein the marker attribute comprises at least one of: a kind of the actual object, a time when the scene including the actual object is recognized by the device, and a position at which the scene including the actual object is recognized by the device, wherein the processor, when executing the one or more instructions, further causes the device to perform at least one operation to extract an AR object corresponding to the identified marker from a previously stored mapping database when the marker is identified.

9. The device of claim 7, wherein the processor, when executing the one or more instructions, further causes the device to perform at least one operation to determine a representative marker of each of the at least one group based on a user input for selecting any one of the plurality of clustered markers.

10. The device of claim 7, wherein the first scene and the second scene include images recognized in a preview mode of a camera application executed by the device.

11. The device of claim 7, wherein the processor, when executing the one or more instructions, further causes the device to perform at least one operation to: cluster a plurality of pieces of content previously obtained by the device into at least one AR object group based on at least one of: a position at which each of the plurality of pieces of content is obtained, and a time when each of the plurality of pieces of content is obtained, and a predetermined reference set through a user input, generate a marker of each of the at least one AR object group using at least one of the plurality of pieces of content and overlap and display content included in an AR object group mapped to the marker on the marker corresponding to the recognized scene when the scene recognized by the device corresponds to any one of the generated marker, wherein the plurality of pieces of content comprise at least one of: an image, voice, music, handwriting information, text, and a moving image.

12. The device of claim 7, wherein the processor, when executing the one or more instructions, further causes the device to perform at least one operation to: separate the AR object from the marker when a predetermined type of user input is received with respect to the AR object overlapped and displayed on the marker in the scene recognized by the device, and overlap and display the separated AR object on a predetermined position in at least one scene recognized by the device based on a position of the received user input.

13. A device comprising:
a memory storing one or more instructions;
a display;
a camera configured to recognize a scene around the device; and
a processor configured to execute the one or more instructions stored in the memory, wherein the processor is configured to, when executing the one or more instructions, causes the device to:
- generate an AR object based on a user input obtained while a first scene recognized by a device is displayed on a screen of the device, wherein a marker maps the AR object to the first scene and wherein the marker is an actual object in the first scene;
- map marker correction information to the marker, and store the marker correction information, wherein the marker correction information comprises at least one of: (i) a position of the user, and (ii) a direction of the device at a time when the first scene is recognized; and
- compare a second scene with the marker based on the marker correction information when the second scene is recognized after storing the marker correction information, and overlap and display the AR object on the second scene when the second scene corresponds to the marker.

14. The device of claim 13, wherein the data received from the user comprises at least one of: handwriting data, voice data, an image, music, text, and a moving image.

15. The device of claim 13, wherein the processor, when executing the one or more instructions, further cause the device to correct the marker based on the position of the user and the direction of the device included in the marker correction information, and compare the corrected scene with the second scene.

16. The device of claim 13, wherein the processor, when executing the one or more instructions, further causes the device to perform at least one operation to: set the device to a preview mode in which a scene is recognized and displayed when any one of a plurality of markers is selected based on a user input received on a marker list comprising information about the plurality of markers, display the selected marker on a screen of the device set as the preview mode and overlap and display an AR object mapped to the selected marker on the marker.

17. A non-transitory computer-readable recording medium having recorded thereon a program for executing the method of claim 1 using a computer.

* * * * *